(12) United States Patent
Tomita et al.

(10) Patent No.: US 7,232,873 B2
(45) Date of Patent: Jun. 19, 2007

(54) POLYCARBOXYLIC ACID CEMENT DISPERSANT AND METHOD FOR PRODUCING CONCRETE SECONDARY PRODUCT

(75) Inventors: Takashi Tomita, Toyonaka (JP); Hirokatsu Kawakami, Izumiotsu (JP); Hiroko Okochi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/820,798

(22) Filed: Apr. 9, 2004

(65) Prior Publication Data

US 2004/0225093 A1 Nov. 11, 2004

(30) Foreign Application Priority Data

Apr. 10, 2003 (JP) ............................. 2003-106890
Apr. 15, 2003 (JP) ............................. 2003-110740

(51) Int. Cl.
*C08F 130/04* (2006.01)
*C04B 24/04* (2006.01)
*C04B 24/16* (2006.01)

(52) U.S. Cl. .................. 526/240; 526/318; 526/319; 524/556; 106/725; 106/808; 106/809; 106/823

(58) Field of Classification Search ................ 526/240, 526/318, 319; 524/556; 106/725, 808, 809, 106/823

See application file for complete search history.

(56) References Cited

U.S. PATENT DOCUMENTS

| | | | |
|---|---|---|---|
| 4,870,120 A | 9/1989 | Tsubakimoto et al. | |
| 5,137,945 A | 8/1992 | Tsubakimoto et al. | |
| 5,707,445 A | 1/1998 | Yamato et al. | |
| 5,854,318 A | 12/1998 | Tahara et al. | |
| 6,294,015 B1 | 9/2001 | Yamashita et al. | |

FOREIGN PATENT DOCUMENTS

| | | |
|---|---|---|
| EP | 0 291 591 A1 | 11/1988 |
| EP | 0 884 290 A2 | 12/1998 |
| JP | 62-119147 | 5/1987 |
| JP | 07-172891 | 7/1995 |
| JP | 07-223852 | 8/1995 |
| JP | 08-012396 | 1/1996 |
| JP | 08-012399 | 1/1996 |
| JP | 08-225352 | 9/1996 |
| JP | 09-040447 | 2/1997 |
| JP | 09-241056 | 9/1997 |
| JP | 11-079811 | 3/1999 |
| JP | 11-106248 | 4/1999 |
| KR | 10-0376366 B1 | 8/1999 |
| WO | WO-95/16643 A1 | 6/1995 |

OTHER PUBLICATIONS

Translation of JP 08-012396, Jan. 16, 1996.*

* cited by examiner

*Primary Examiner*—Elizabeth D. Wood
(74) *Attorney, Agent, or Firm*—Connolly, Bove, Lodge & Hutz, LLP

(57) ABSTRACT

A polycarboxylic acid cement dispersant that can exhibit high dispersing ability and allow deforming in early stages in the case of producing concrete products, whereby the turnover of a formwork is increased so as to improve productivity, and the method of producing such as concrete product are provided. The polycarboxylic acid cement dispersant which provides a cement composition having a penetration resistance value exponent of 55 MPa or more and a slump retention exponent of 80% or more, and the method of producing a concrete product which makes use of a copolymer derived by using monomer components comprising the monomer (A) as polyalkylene glycol unsaturated monomer, the monomer (B) as unsaturated carboxylic monomer, and the monomer (C) as sulfonic acid group-containing monomer.

18 Claims, No Drawings

POLYCARBOXYLIC ACID CEMENT DISPERSANT AND METHOD FOR PRODUCING CONCRETE SECONDARY PRODUCT

TECHNICAL FIELD

The present invention relates to a polycarboxylic acid cement dispersant and a method for producing a concrete secondary product. More particularly, it relates to a polycarboxylic acid cement dispersant suitable for producing a concrete product (precast concrete), and a method for producing a concrete product made by pouring concrete into a formwork in factories.

BACKGROUND ART

Cement paste in which water is added to cement, mortar in which sand as fine aggregate is mixed into the cement paste, and concrete having fluidity improved by a dispersant, in which gravel as coarse aggregate is further mixed into the mortar have been used in great quantities for various structural materials and the like. In such concrete, concrete products (precast concrete) have been in increasing demand mainly in Europe and America. Concrete products are made by pouring concrete into a formwork in factories, and concrete members thus made are carried to a building site and constructed. In a method of producing such concrete products, deforming from a formwork in early stages is required for the purpose of improving productivity in factories, and an usual dispersant causes a high degree of hardening-retardation and needs a long time until deforming. Steam curing is generally performed in factories, also in which case increasing the turnover of a formwork and improving productivity is required. Standard processes of steam curing are as follows. That is, concrete is poured into a formwork and compacted to thereafter stand as pre-curing at ordinary temperature for approximately 2 to 4 hours. Subsequently, vapor starts to be ventilated and the concrete is heated up by a heating-up temperature of 15 to 20° C./hour (in general, 20° C./hour or less). Typically, after reaching a curing temperature of approximately 50 to 80° C., isothermal curing is performed while maintaining the temperature for 2 to 4 hours to thereafter stop the ventilation of vapor, and the curing ends through a slow cooling period by natural standing to cool. Deforming from the formwork is performed during this slow cooling period to divert the formwork to next producing cycle. Also, a manner such as to cover the periphery of a formwork with a heal insulator (an isolating material) is occasionally adopted as a method for increasing the turnover of a formwork except steam curing. This allows time for deforming to be shortened by utilizing self-heat of hydration of cement to promptly raise the temperature in the system.

Further, an improvement in durability and strength of concrete buildings have been greatly required in the recent concrete industry, and a reduction in the unit water content has been an important problem for achieving this improvement. In addition, mortar and concrete is hardened by the progress with time of hydration reaction between cement and water, so that slump loss is generally inevitable, which is a phenomenon of the deterioration of fluidity with time passing after adding water. Accordingly, a dispersant has been required, which allows the dispersing ability of cement to be held and is suitable for producing a concrete product.

The following precedent technical document is referred to for a conventional polycarboxylic acid cement dispersant.

Japanese Kokai Publication Hei-08-12396 discloses a copolymer and the like obtained by polymerizing methoxypolyethylene glycol acrylate (the molar number of addition of the ethylene oxides (EO) is 75) and sodium acrylate, with respect to a concrete admixture using polyalkylene glycol ester monomer, wherein the terminal group is a hydrogen atom or an alkyl group containing 1 to 3 carbon atoms and the molar number of addition of the oxyalkylene groups is 50 to 100. However, there was a room for contrivance in order to suitably make it possible to use such concrete admixture for concrete products and the like, by further improving hardening-retardation and further improving strength in early stages.

Japanese Kokai Publication Hei-08-225352 discloses a concrete admixture using polyalkylene glycol monoester monomer, wherein the terminal group is a hydrogen atom or an alkyl group containing 1 to 3 carbon atoms and the molar number of addition of the oxyalkylene groups is 100 to 110. Japanese Kokai Publication Hei-07-223852 discloses a concrete admixture containing a copolymer obtained by polymerizing methanol EO/acrylic acid monoester (the molar number of addition of EO is 220) and acrylic acid in Examples, with respect to a concrete admixture using polyalkylene glycol monoester monomer, wherein the terminal group is a hydrogen atom or an alkyl group containing 1 to 3 carbon atoms and the molar number of addition of the oxyalkylene group is 110 to 300. However, these concrete admixtures are not considered to be suitably used for concrete products; therefore, there was a room for contrivance in order to make it possible to use such concrete admixtures preferably for concrete products and the like, by improving strength in early stages with a high dispersing ability obtained.

Japanese Kokai Publication Hei-08-12399 discloses an admixture composition for concrete products using polyalkylene glycol monoester monomer, wherein the terminal group is a hydrogen atom or an alkyl group containing 1 to 3 carbon atoms and the molar number of addition of the oxyalkylene groups is 110 to 300. However, this admixture composition for concrete products is used for manufacturing concrete products compacted by a vibrator and centrifugal force, and is intended for shortening molding time by reducing air voids on the surface of the products and improving the compacting properties of concrete. Therefore, there was a room for contrivance in order to suitably make it possible to use such admixture composition for concrete products and the like, by improving hardening-retardation and further improving strength in early stages, for the purpose of improving productivity in factories.

Japanese Kokai Publication Hei-11-106248 discloses a cement admixture containing a copolymer of 1-butoxypolyethylene monomethacrylate (the molar number of addition of the ethylene oxides is 75 to 130) and methacrylic acid in Examples, with respect to a cement admixture using polyalkylene glycol monoester monomer, wherein the terminal group is an alkyl group containing 2 to 5 carbon atoms and the molar number of addition of the oxyalkylene groups is not less than 30. Japanese Kokai Publication Hei-09-241056 discloses a concrete admixture using polyalkylene glycol monoester monomer, wherein the terminal group is an alkyl group containing 6 to 18 carbon atoms and the molar number of addition of the oxyalkylene groups is 2 to 300. However, also in such concrete admixture, there was a room for contrivance in order to increase in the turnover of a formwork by deforming in early stages in the case of using for concrete products, by further improving hydrophilicity and improving hardening-retardation.

Furthermore, the following precedent technical document is referred to for a conventional cement dispersant using a sulfonic acid monomer.

Japanese Kokai Publication Sho-62-119147 discloses a cement dispersant using a copolymer of sodium 2-sulfoethyl acrylate, sodium acrylate and methoxy polyethylene glycol monoacrylate (the molar number of addition of the ethylene oxides is 10) in Examples, with respect to a cement dispersant using sulfonic acid monomer as a necessary component. However, this cement dispersant is intended for securing a stable workability by improving the slump loss preventing ability, for which a copolymer having a high content of 2-sulfoethyl acrylate sodium is used. In view of structure and content of a sulfonic group-containing monomer, therefore, there was a room for contrivance in order to suitably make it possible to use such dispersant for manufacturing concrete products and the like, by improving dispersing ability and strength in early stages for the purpose of improving productivity in factories.

Japanese Kokai Publication Hei-07-172891 discloses a cement dispersant using a copolymer of vinyl compounds containing a sulfonic acid group, sodium (meth)acrylate, and methoxy polyethylene glycol mono(meth)acrylate (the molar number of addition of the ethylene oxides is 4 to 23) in Examples, with respect to a cement dispersant using a copolymer of vinyl compounds having polyoxyalkylene chain and vinyl compounds containing a sulfonic acid group. However, this cement dispersant has a high content of sulfonic acid in a copolymer; therefore, there was a room for contrivance in order to increase in the turnover of a formwork by deforming in early stages in the case of using for producing concrete products, by further improving dispersing ability and strength in early stages.

Japanese Kokai Publication Hei-11-79811 discloses a cement dispersant using a copolymer of a sulfonic acid group-containing monomer, (meth)acrylic acid, and esterified compound (the molar number of addition of the ethylene oxides is 23 to 350) obtained by esterification of polyethylene glycol containing lower alkyl group at one end and (meth) acrylic acid, in Examples, with respect to a cement dispersant using a vinyl copolymer containing a long-chain oxyalkylene group and a specific monomer. However, this cement dispersant is intended for improving workability by achieving a low viscosity of concrete. In order to improve productivity in factories, therefore, there was a room for contrivance in order to suitably make it possible to use such dispersant for concrete products and the like, by improving hardening-retardation and further improving strength in early stages.

BRIEF SUMMARY OF THE INVENTION

It is an object of the present invention, which has been made in view of the above-mentioned state of the art, to provide a polycarboxylic acid cement dispersant which exhibits a high dispersing ability and allows deforming in early stages in the case of producing concrete products and the like, whereby the turnover of a formwork is increased so as to improve productivity, and to provide a method of producing a concrete product which allows deforming in early stages, whereby the turnover of a formwork is increased so as to improve productivity.

In the course of investigations made by them in search of a polycarboxylic acid cement dispersant, the present inventors found out that a copolymer of methacrylic acid and methacrylate of polyalkylene glycol (ethylene oxide (EO) chain length is 25 mol or less) exhibits a high dispersing ability and that such a dispersant is useful for manufacturing concrete or the like. The present inventors have also found out that strength in early stages is improved, in other words, the degree of hardening-retardation is reduced by using a polycarboxylic acid cement dispersant which provides a cement composition having a penetration resistance value exponent of 55 MPa or more and a slump retention exponent of 80% or more, and by rendering a main chain skeleton acrylic to lengthen alkylene oxide (AO) chain length in ester, particularly, ethylene oxide (EO) chain length in ester, and consequently they came to realize that the above-mentioned object can thus be successfully accomplished. Typically, the function of a polycarboxylic acid cement dispersant inhibits the hydration of cement particles to improve fluidity; however, by means of rendering a main chain skeleton acrylic to lengthen ethylene oxide (EO) chain length in ester, the synergistic function thereof improves hydrophilicity of the copolymer, resulting in moderately easy hydration of cement particles and allowing deforming in early stages in the case of producing concrete products, whereby the turnover of a formwork is increased so as to improve productivity. In addition, it is forecast that a smaller carbon number of a terminal alkyl group in ester improves the hydrophilicity of the copolymer, and a similar effect of improving productivity can be expected.

In the course of investigations made by them in search of a method of producing a concrete product, the present inventors paid attention to the fact that when a copolymer introduced by using a polyalkylene glycol unsaturated monomer, an unsaturated carboxylic acid monomer and a sulfonic group-containing monomer is used as a dispersant, a concrete product exhibiting a high dispersing ability can be manufactured, and they found that when making the mass ratio of the sulfonic group-containing monomer relative to total monomer components into 0.1% by mass or more and 35% by mass or less with the structure of these monomers specified, strength in early stages of the concrete product is improved, in other words, the degree of hardening-retardation is reduced. Such findings have now led to completion of the present invention. When the above-mentioned mass ratio exceeds 35% by mass, sufficient water-reducing performance and dispersing ability may be not obtained, resulting in the need to increase the quantity added of the copolymer to a cement composition. In this vase, the quantity of the copolymer attached to cement particles is increased so as to inhibit the hydration reaction of cement particles and not sufficiently improve strength in early stages. Further, when the above-mentioned mass ratio is less than 0.1% by mass, strength in early stages are also sufficiently improved. Therefore, by means of making the mass ratio of the sulfonic group-containing monomer relative to total monomer components forming the above-mentioned copolymer into 0.1% by mass or more and 35% by mass or less, cement particles are easily hydrated in moderation to allow deforming in early stages, whereby a concrete product can be produced such that the turnover of a formwork is increased so as to improve productivity.

Therefore, the present invention is a polycarboxylic acid cement dispersant which provides a cement composition having a penetration resistance value exponent of 55 MPa or more and a slump retention exponent of 80% or more.

The present invention is also concerned with a method of producing a concrete product which comprises a process of curing under a condition of a temperature of 30° C. or more, using the polycarboxylic acid cement dispersant.

The present invention is also related to a method of producing a concrete product which comprises a process of curing by covering a periphery of a formwork with an insulating material, using the polycarboxylic acid cement dispersant.

The present invention is also concerned with a method of producing a concrete product which makes use of a copolymer derived by using monomer components comprising a monomer (A) represented by the following general formula (3):

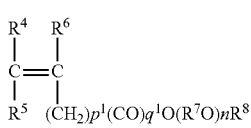

(3)

(wherein $R^4$, $R^5$ and $R^6$ may be the same or different and each represents a hydrogen atom or a methyl group; $p^1$ represents a number of 0 to 2; $q^1$ represents a number of 0 or 1; $R^7O$ may be the same or different and each represents an oxyalkylene group containing 2 to 18 carbon atoms; n represents the average molar number of addition of the oxyalkylene groups and is a number of 2 to 300; and $R^8$ represents a hydrogen atom or a hydrocarbon group containing 1 to 30 carbon atoms), a monomer (B) represented by the following general formula (4):

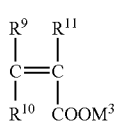

(4)

(wherein $R^9$ and $R^{10}$ maybe the same or different and each represents a hydrogen atom, a methyl group or —COOM$^4$, provided that $R^9$ and $R^{10}$ does not simultaneously represent —COOM$^4$; $R^{11}$ represents a hydrogen atom, a methyl group or —CH$_2$COOM$^5$, in which in the case where $R^{11}$ represents —CH$_2$COOM$^5$, $R^9$ and $R^{10}$ may be the same or different and each represents a hydrogen atom or a methyl group; and M$^3$, M$^4$ and M$^5$ may be the same or different and each represents a hydrogen atom, a monovalent metal, a divalent metal, ammonium or organic ammonium), and a monomer (C) represented by the following general formula (5):

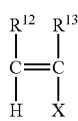

(5)

X:

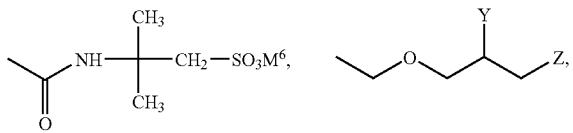

-continued

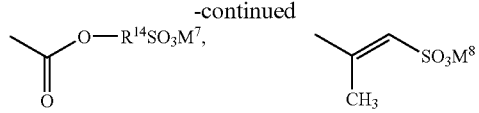

(wherein $R^{12}$ and $R^{13}$ maybe the same or different and each represents a hydrogen atom or a methyl group; Y and Z represent a hydroxyl group or —SO$_3$M$^9$, in which in the case where Y represents a hydroxyl group, Z represents —SO$_3$M$^9$, while in the case where Y represents —SO$_3$M$^9$, Z represents a hydroxyl group; $R^{14}$ represents an alkylene group containing 2 to 4 carbon atoms; and M$^6$, M$^7$, M$^8$ and M$^9$ may be the same or different and each represents a hydrogen atom, a monovalent metal, a divalent metal, ammonium or organic ammonium), wherein the mass ratio of the monomer (C) relative to the total monomer components is not less than 0.1% by mass and not more than 35% by mass.

DETAILED DESCRIPTION OF THE INVENTION

In the following, the present invention is described in detail.

A polycarboxylic acid cement dispersant of the present invention is the one which provides a cement composition having a penetration resistance value exponent of 55 MPa or more and a slump retention exponent of 80% or more. Furthermore, "a polycarboxylic acid cement dispersant" means a composition for using as a cement dispersant comprising a polycarboxylic acid or an analogous compound thereof such as the polymer described in this description, for example a derivative or a polycarboxylic acid salt.

The above-mentioned penetration resistance value exponent (index) signifies a penetration resistance value under the conditions of a temperature of 20° C. after 7 hours, which value is an indicator denoting resistance to a load perpendicularly taken on the surface of a test piece and is measured in the following manner.

(Method of Measuring Penetration Resistance Value Exponent)

(1) Mortar test material: Mortar for obtaining a mortar test piece necessary for measuring penetration resistance value exponent is prepared by using the following material at room temperature (20±2° C.).

European standard cement (CEM I 52.5): 500 g

Fine aggregate (standard sand for cement strength test: JIS R5201, made by Japan Cement Association): 1350 g Deionized water containing a cement admixture of the present invention (or a comparative cement admixture) and an antifoaming agent (trade name "MA404", made by NMB, Addition amount: 2% by mass of a 1% by mass aqueous solution of MA404 relative to the mass of cement (100% by mass of cement)): 200 g (2) Method of preparing mortar: 500 g of European standard cement and 200 g of a cement admixture weighing a predetermined quantity (an added quantity necessary for making flow value measured in accordance with the after-mentioned measuring method into a range of 220±10 mm), which cement admixture is diluted by deionized water, are charged into a Hobert type mortar mixer (Model N-50, manufactured by Hobert) and mixed at low-speed rotations for 30 seconds to thereafter charge 1350 g of fine aggregate over 30 seconds. After charging, the contents are mixed at medium-speed rotations for another 30 seconds to stop the rotations and thereafter scrape off cement attached on the wall surface within 15 seconds. Then, 1 minute and 30 seconds after stopping the rotations, the mixing is resumed at medium-speed rotations again and performed for 1 minute to obtain a cement composition (mortar).

(3) Method of measuring flow value: Performed in conformance with JIS R5201

(4) Method of measuring air content: The weight of prepared mortar with a volume of 500 ml is measured, and air content is measured from the specific gravity of used materials.

(5) Method of preparing test specimen for measuring penetration resistance value: The mortar prepared in the above-mentioned manner is charged into a plastic container (Pack Ace 250 cc, manufactured by Teraoka Corp.) by two stages and poked 10 times with a glass rod at every stage, and thereafter the bottom of the container is patted 10 times with hands to remove air in the mortar. Then, the container is sealed by closing a lid and is made into a test specimen.

(6) Method of measuring penetration resistance value exponent: The test specimen prepared in the above-mentioned manner is charged into a thermoregulator retained at a temperature of 20° C. and then stands for 7 hours and thereafter is taken out so as to measure penetration resistance value by using a Vicat needle device prescribed in JIS R5201. The measurement is performed twice and the average value is regarded as penetration resistance value exponent in the present invention.

Also, the above-mentioned slump retention exponent can be calculated by the following expression:

Slump retention exponent (%)=100×(mortar flow value after 30 minutes)/(initial mortar flow value)

Here, initial mortar flow value is measured in accordance with the above-mentioned measuring method. After measuring flow value, the total amount of mortar stands at room temperature (20±2° C.) for a predetermined time in the sealed container and the same process is repeated, and then the change with time of mortar flow is measured. The addition amount of a cement dispersant relative to mortar (% by mass of solid content relative to cement) is an addition amount necessary for making initial mortar flow value into a range of 220±10 mm.

The polycarboxylic acid cement dispersant of the present invention provides the cement composition with penetration resistance value exponent and slump retention exponent in the above-mentioned range. When the above-mentioned penetration resistance value exponent is less than 55 MPa or the above-mentioned slump retention exponent is less than 80%, hardening-retardation is not sufficiently inhibited and fluidity is not sufficiently improved; therefore, for example in the case of using for manufacturing concrete (secondary) products in factories, the effect of the present invention such that the turnover of a formwork is increased by deforming in early stages may be not sufficiently exhibited and productivity may be not sufficiently improved. A preferable form (mode, embodiment) of the present invention is a form in which penetration resistance value exponent of 60 MPa or more and slump retention exponent of 82% or more. More preferably, penetration resistance value exponent of 65 MPa or more and slump retention exponent of 85% or more, still more preferably, penetration resistance value exponent of 70 MPa or more and slump retention exponent of 90% or more.

The above-mentioned polycarboxylic acid cement dispersant is preferably, for example, a cement dispersant comprising a copolymer of (meth) acrylic acid and (meth) acrylate of polyalkylene glycol. A suitable form of such a copolymer involves (1) a form in which a main chain skeleton is mainly acrylic, (2) a form in which alkylene oxide (AO) chain length in ester is long, (3) a form in which the carbon number of a terminal alkyl group in ester is small, (4) a form obtained by copolymerizing the monomer components further comprising a sulfonic acid group-containing monomer as the third component, and the like. Furthermore, it may be a form, which is a combination of two or more forms of the above (1) to (4)

In the above-mentioned form (1), an acrylic constituent unit is preferably 80 mole percent (mole %) or more relative to 100 mol % of total constituent units (monomer units) forming the main chain skeleton. More preferably, it is 90 mole % or more, most preferably, the whole constituent units forming the main chain skeleton are acrylic.

In the above-mentioned form (2), the alkylene oxide (AO) chain length is, as the average molar number of addition of the oxyalkylene group, preferably 100 to 200. It is more preferably not less than 100 and not more than 125, still more preferably not less than 100 and not more than 110. In addition, it is preferred that the oxyalkylene group comprises the oxyethylene group as main component. More preferably, the oxyethylene group is not less than 50 mole % relative to the whole oxyalkylene group, still more preferably, it is not less than 90 mole %, most preferably, the whole oxyalkylene groups are composed of oxyethylene group.

In the above-mentioned form (3), the carbon number of a terminal alkyl group in ester is preferably 1 to 3. It is more preferably an alkyl group containing 2 or less carbon atoms, and a saturated alkyl group and an unsaturated alkyl group are more preferable among these alkyl groups. Still more preferred is a saturated alkyl group containing 1 carbon atoms, that is, methyl group.

In the above-mentioned form (4), the sulfonic acid group-containing monomer may be any of those having a sulfonic acid group in the molecule, and it is not particularly limited. Especially proffered is the monomer represented the following general formula (5):

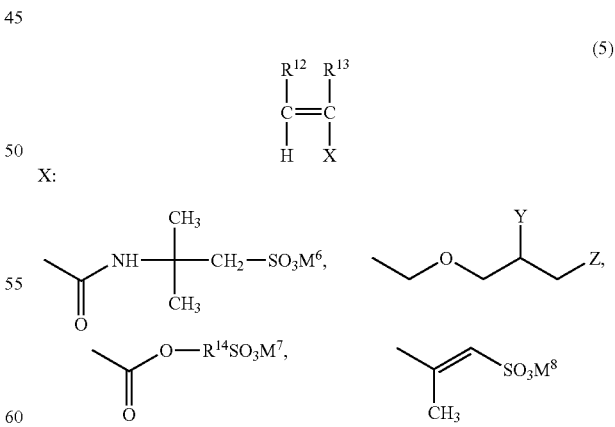

(wherein $R^{12}$ and $R^{13}$ may be the same or different and each represents a hydrogen atom or a methyl group; Y and Z represent a hydroxyl group or —$SO_3M^9$, in which in the case where Y represents a hydroxyl group, Z represents —$SO_3M^9$, while in the case where Y represents —$SO_3M^9$, Z represents a hydroxyl group; $R^{14}$ represents an alkylene group containing 2 to 4 carbon atoms; and $M^6$, $M^7$, $M^8$ and $M^9$ may be the same or different and each represents a hydrogen atom, a monovalent metal, a divalent metal, ammonium or organic ammonium). In the present invention, when the sulfonic acid group-containing monomer is further used, the effect of the present invention such that hardening-retardation is improved and strength in early stages is further improved can be produced further effectively. Thus, the above-mentioned polycarboxylic acid dispersant containing a copolymer obtained by copolymerization of monomer components comprising (meth) acrylic acid, (meth) acrylate of polyalkylene glycol, and a sulfonic acid group-containing monomer is also one of the preferred form of the present invention. Furthermore, the above-mentioned monomer represented by the general formula (5) is as mentioned later.

In the above-mentioned copolymer obtained by copolymerization of monomer components comprising (meth) acrylic acid, (meth) acrylate of polyalkylene glycol, and a sulfonic acid group-containing monomer, the mass ratio of the sulfonic acid group-containing monomer relative to the total monomer components is preferably not less than 0.1% by mass and not more than 35% by mass. When the above-mentioned mass ratio exceeds 35% by mass, sufficient water-reducing performance and dispersing ability may be not obtained, resulting in the need to increase the quantity added of the copolymer to a cement composition. In this case, the quantity of the copolymer attached to cement particles is increased; therefore, the hydration reaction of cement particles is inhibited and strength in early stages is not sufficiently improved. More preferably, it is not more than 20% by mass, still more preferably not more than 10% by mass, especially preferably not more than 5% by mass. On the other hand, when the above-mentioned mass ratio is less than 0.1% by mass, strength in early stages are also sufficiently improved. More preferably, it is not less than 0.2% by mass, still more preferably not less than 0.5% by mass, especially preferably not less than 1% by mass.

The preferred embodiment of the above-mentioned polycarboxylic acid dispersant is the polycarboxylic acid cement dispersant comprising a polycarboxylic acid polymer having
a polyoxyalkylene ester constituent unit (I) represented by the following general formula (1):

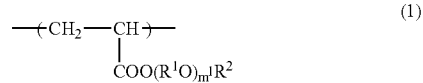
(1)

(wherein $R^1O$ may be the same or different and each represents an oxyalkylene group containing 2 to 18 carbon atoms; $m^1$ represents the average molar number of addition of the oxyalkylene groups and is a number of 100 to 200; and $R^2$ represents a hydrogen atom or a hydrocarbon group containing 1 to 3 carbon atoms), and
a carboxylic acid constituent unit (II) represented by the following general formula (2):

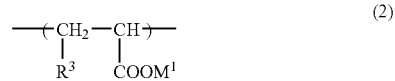
(2)

(wherein $R^3$ represents a hydrogen atom, a methyl group or —$COOM^2$; and $M^1$ and $M^2$ may be the same or different and each represents a hydrogen atom, a monovalent metal, a divalent metal, ammonium or organic ammonium).

The number of carbon atoms in the oxyalkylene group $R^1O$ in the general formula (1) is suitably 2 to 18 but preferably 2 to 8, more preferably 2 to 4. It is preferred that the oxyalkylene group comprises the oxyethylene group as necessary component, with the oxyethylene group preferably accounting for 50 mole % or more, more preferably 90 mole % or more, most preferably, the whole oxyalkylene groups are oxyethylene group. In addition, the repeating unit of the oxyalkylene group may be the same or different. When the oxyalkylene group is constituted of two or more oxyalkylene group species, the two or more oxyalkylene group species may be in any of the addition modes including the random, block, alternating, and other addition modes. Thus, the copolymer containing an oxyethylene group can be made into water-soluble, and the copolymer in such a form is preferably used in the present invention.

In the above-mentioned polyoxyalkylene ester constituent unit (I), $m^1$ as the average molar number of addition of the oxyalkylene groups represented by $R^1O$ is preferably made into a range of 100 to 200. When the average molar number of addition of the oxyalkylene groups is less than 100, strength in early stages may be not sufficient. When it exceeds 200, slump retention ability maybe not sufficient to cause early hardening, whereby an appropriate fluidity may not be obtained. More preferably 100 to 125, still more preferably 100 to 110. In addition, oxyethylene group are preferably contained as necessary component, among the oxyalkylene groups. Furthermore, the average molar number of addition means the average value for the molar number of the oxyalkylene group(s) in question forming each mole of monomer by addition in the polyoxyalkylene ester constituent unit (I)-component.

With regard to a terminal group $R^2$ in the above-mentioned general formula (1), when its carbon number exceeds 3, the effect such that hydrophilicity is further improved for easy deforming from a formwork maybe not sufficiently obtained. The terminal group is preferably a hydrocarbon group containing 2 or less carbon atoms, and a saturated alkyl group and an unsaturated alkyl group are more preferable among hydrocarbon groups. Still more preferably, it is a saturated alkyl group containing 1 carbon atom, namely, a methyl group. It is noted that these alkyl groups may be linear or branched.

The above-mentioned polyoxyalkylene ester constituent unit (I) is preferably the one obtained by polymerization of a monomer (a) represented by the general formula (6);

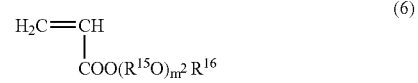
(6)

(wherein $R^{15}O$ may be the same or different and each represents an oxyalkylene group containing 2 to 18 carbon atoms, $m^2$ represents the average molar number of addition of the oxyalkylene groups and is number of 100 to 200, $R^{16}$ represents a hydrogen atom or a hydrocarbon group containing 1 to 3 carbon atoms.)

As for $R^{15}O$, $m^2$ and $R^{16}$ in the above general formula (6), the same as mentioned above referring to $R^1O$, $m^1$ and $R^2$ in the general formula (1) may be mentioned. From the viewpoint of esterification productivity improvement with (meth)

acrylic acid, it is preferred that ethylene oxide moiety be added to the site of the ester bond with (meth)acrylic acid.

As for the above-mentioned monomer (a), suitable are esterification product of acrylic acid with polyoxyalkylene glycol, especially preferably polyoxyalkylene glycol which is mainly formed of an ethylene oxide group(s), obtained by addition of 100 to 200 moles of an alkylene oxide group(s) containing 2 to 18 carbon atoms to any of aliphatic alcohol containing 1 to 3 carbon atoms such as methanol, ethanol, 1-propanol and 2-propanol; alicyclic alcohol containing 3 carbon atoms such as cyclopropanol; and unsaturated alcohol containing 3 carbon atoms such as allyl alcohol. Furthermore, "mainly" means that when two or more oxyalkylene group species occur in the monomer, the oxyethylene group accounts for a majority relative to the number of all the oxyalkylene groups occurring.

Suitable as the monomer (a) are also those (alkoxy)polyethylene glycol mono(meth)acrylate and (alkoxy) polyethylene glycol (poly) (alkylene glycol containing 2 to 4 carbon atoms) (meth)acrylate which are given below.

Suitable as the (alkoxy)polyethylene glycol mono(meth)acrylate are esterification product of (meth)acrylic acid with alkoxypolyalkylene glycol, especially preferably alkoxypolyalkylene glycol which is mainly formed of an ethylene oxide group(s), obtained by addition of 1 to 300 moles of an alkylene oxide group(s) containing 2 to 18 carbon atoms to any of aliphatic alcohol containing 1 to 30 carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol; alicyclic alcohol containing 3 to 30 carbon atoms such as cyclohexanol; and unsaturated alcohol containing 3 to 30 carbon atoms such as (meth)allyl alcohol, 3-buten-1-ol and 3-methyl-3-buten-1-ol.

Suitable as the (alkoxy)polyethylene glycol (poly)(alkylene glycol containing 2 to 4 carbon atoms) (meth)acrylate are the following:

Methoxypolyethylene glycol mono(meth)acrylate, methoxy{polyethylene glycol-(poly)propylene glycol} mono(meth)acrylate, methoxy{polyethylene glycol-(poly)butylene glycol} mono(meth)acrylate, methoxy{polyethylene glycol-(poly)propylene glycol-(poly)butylene glycol} mono(meth)acrylate, ethoxypolyethylene glycol mono(meth)acrylate, ethoxy{polyethylene glycol-(poly)propylene glycol} mono(meth)acrylate, ethoxy{polyethylene glycol-(poly)butylene glycol} mono(meth)acrylate, ethoxy{polyethylene glycol-(poly)propylene glycol-(poly)butylene glycol} mono(meth)acrylate, propoxypolyethylene glycol mono(meth)acrylate, propoxy{polyethylene glycol-(poly)propylene glycol} mono(meth)acrylate, propoxy{polyethylene glycol-(poly)butylene glycol} mono(meth)acrylate, propoxy{polyethylene glycol-(poly)propylene glycol-(poly)butylene glycol} mono(meth)acrylate, butoxypolyethylene glycol mono(meth)acrylate, butoxy{polyethylene glycol-(poly)propylene glycol} mono(meth)acrylate, butoxy{polyethylene glycol-(poly)butylene glycol} mono(meth)acrylate, butoxy{polyethylene glycol-(poly)propylene glycol-(poly)butylene glycol} mono(meth)acrylate, pentoxypolyethylene glycol mono(meth)acrylate, pentoxy{polyethylene glycol-(poly)propylene glycol} mono(meth)acrylate, pentoxy{polyethylene glycol-(poly)butylene glycol} mono(meth)acrylate, pentoxy{polyethylene glycol-(poly)propylene glycol-(poly)butylene glycol} mono(meth)acrylate, hexoxypolyethylene glycol mono(meth)acrylate, hexoxy{polyethylene glycol-(poly)propylene glycol} mono(meth)acrylate, hexoxy{polyethylene glycol-(poly)butylene glycol} mono(meth)acrylate, hexoxy{polyethylene glycol-(poly)propylene glycol-(poly)butylene glycol} mono(meth)acrylate, heptoxypolyethylene glycol mono(meth)acrylate, heptoxy{polyethylene glycol-(poly)propylene glycol} mono(meth)acrylate, heptoxy{polyethylene glycol-(poly)butylene glycol} mono(meth)acrylate, heptoxy{polyethylene glycol-(poly)propylene glycol-(poly)butylene glycol} mono(meth)acrylate, octoxypolyethylene glycol mono(meth)acrylate, octoxy{polyethylene glycol-(poly)propylene glycol} mono(meth)acrylate, octoxy{polyethylene glycol-(poly)butylene glycol} mono(meth)acrylate, octoxy{polyethylene glycol-(poly)propylene glycol-(poly)butylene glycol} mono(meth)acrylate, nonanoxypolyethylene glycol mono(meth)acrylate, nonanoxy{polyethylene glycol-(poly)propylene glycol} mono(meth)acrylate, nonanoxy{polyethylene glycol-(poly)butylene glycol} mono(meth)acrylate, nonanoxy{polyethylene glycol-(poly)propylene glycol-(poly)butylene glycol} mono(meth)acrylate, decanoxypolyethylene glycol mono(meth)acrylate, decanoxy{polyethylene glycol-(poly)propylene glycol} mono(meth)acrylate, decanoxy{polyethylene glycol-(poly)butylene glycol} mono(meth)acrylate, decanoxy{polyethylene glycol-(poly)propylene glycol-(poly)butylene glycol} mono(meth)acrylate, undecanoxypolyethylene glycol mono(meth)acrylate, undecanoxy{polyethylene glycol-(poly)propylene glycol} mono(meth)acrylate, undecanoxy{polyethylene glycol-(poly)butylene glycol} mono(meth)acrylate, undecanoxy{polyethylene glycol-(poly)propylene glycol-(poly)butylene glycol} mono(meth)acrylate, dodecanoxypolyethylene glycol mono(meth)acrylate, dodecanoxy{polyethylene glycol-(poly)propylene glycol} mono(meth)acrylate, dodecanoxy{polyethylene glycol-(poly)butylene glycol} mono(meth)acrylate, dodecanoxy{polyethylene glycol-(poly)propylene glycol-(poly)butylene glycol} mono(meth)acrylate, tridecanoxypolyethylene glycol mono(meth)acrylate, tridecanoxy{polyethylene glycol-(poly)propylene glycol} mono(meth)acrylate, tridecanoxy{polyethylene glycol-(poly)butylene glycol} mono(meth)acrylate, tridecanoxy{polyethylene glycol-(poly)propylene glycol-(poly)butylene glycol} mono(meth)acrylate, tetradecanoxypolyethylene glycol mono(meth)acrylate, tetradecanoxy{polyethylene glycol-(poly)propylene glycol} mono(meth)acrylate, tetradecanoxy{polyethylene glycol-(poly)butylene glycol} mono(meth)acrylate, tetradecanoxy{polyethylene glycol-(poly)propylene glycol-(poly)butylene glycol} mono(meth)acrylate, pentadecanoxypolyethylene glycol mono(meth)acrylate, pentadecanoxy{polyethylene glycol-(poly)propylene glycol} mono(meth)acrylate, pentadecanoxy{polyethylene glycol-(poly)butylene glycol} mono(meth)acrylate, pentadecanoxy{polyethylene glycol-(poly)propylene glycol-(poly)butylene glycol} mono(meth)acrylate, hexadecanoxypolyethylene glycol mono(meth)acrylate, hexadecanoxy{polyethylene glycol-(poly)propylene glycol} mono(meth)acrylate, hexadecanoxy{polyethylene glycol-(poly)butylene glycol)}mono(meth)acrylate, hexadecanoxy{polyethylene glycol-(poly)propylene glycol-(poly)butylene glycol} mono(meth)acrylate, heptadecanoxypolyethylene glycol mono(meth)acrylate, heptadecanoxy{polyethylene glycol-(poly)propylene glycol} mono(meth)acrylate, heptadecanoxy{polyethylene glycol-(poly)butylene glycol} mono(meth)acrylate, heptadecanoxy{polyethylene glycol-(poly)propylene glycol-(poly)butylene glycol} mono(meth)acrylate, octadecanoxypolyethylene glycol mono(meth)acrylate, octadecanoxy{polyethylene glycol-(poly)propylene glycol} mono(meth)acrylate, octadecanoxy{polyethylene glycol-(poly)butylene glycol} mono(meth)acrylate, octadecanoxy{polyethylene glycol-(poly)propylene glycol-(poly)butylene glycol} mono(meth)acrylate, nonadecanoxypolyethylene glycol mono(meth)acrylate, nonadecanoxy{polyethylene glycol-(poly)propylene glycol} mono(meth)acrylate, nonadecanoxy{polyethylene glycol-(poly)butylene glycol} mono(meth)acrylate, nonadecanoxy{polyethylene glycol-(poly)propylene glycol-(poly)butylene glycol} mono(meth)acrylate, cyclopentoxypolyethylene glycol mono(meth)acrylate, cyclopentoxy{polyethylene glycol-(poly)propylene glycol} mono(meth)acrylate, cyclopentoxy{polyethylene glycol-(poly)butylene glycol} mono(meth)acrylate, cyclopentoxy{polyethylene glycol-(poly)propylene glycol-(poly)butylene glycol} mono(meth)acrylate, cyclohexoxypolyethylene glycol mono(meth)acrylate, cyclohexoxy{polyethylene glycol-(poly)propylene glycol} mono(meth)acrylate, cyclohexoxy{polyethylene glycol-(poly)butylene glycol} mono(meth)acrylate, cyclohexoxy{polyethylene glycol-(poly)propylene glycol-(poly)butylene glycol} mono(meth)acrylate.

As the above-mentioned monomer (a), not only compounds as mentioned above, but also phenoxypolyethylene glycol mono(meth)acrylate, phenoxy{polyethylene glycol-(poly)propylene glycol} mono(meth)acrylate, phenoxy{polyethylene glycol-(poly)butylene glycol} mono (meth)acrylate, phenoxy{polyethylene glycol-(poly)propylene glycol-(poly)butylene glycol} mono(meth)acrylate, (meth)allyloxypolyethylene glycol mono(meth)acrylate, (meth)allyloxy{polyethylene glycol-(poly)propylene glycol} mono(meth)acrylate, (meth)allyloxy{polyethylene glycol-(poly)butylene glycol} mono(meth)acrylate and (meth) allyloxy{polyethylene glycol-(poly)propylene glycol-(poly) butylene glycol} mono(meth)acrylate are suitable.

Furthermore, as an unsaturated alcohol-polyalkylene glycol adduct, polyethylene glycol monovinyl ether, polyethylene glycol monoallyl ether, polyethylene glycol mono(2-methyl-2-propenyl) ether, polyethylene glycol mono(2-butenyl) ether, polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl)ether, polyethylene-polypropylene glycol mono(3-methyl-3-butenyl) ether, methoxypolyethylene glycol mono (3-methyl-3-butenyl) ether, ethoxypolyethylene glycol mono(3-methyl-3-butenyl) ether, 1-propoxypolyethylene glycol mono (3-methyl-3-butenyl) ether, cyclohexyloxypolyethylene glycol mono (3-methyl-3-butenyl) ether, 1-octyloxypolyethylene glycol mono(3-methyl-3-butenyl) ether, nonylalkoxypolyethylene glycol mono(3-methyl-3-butenyl) ether, laurylalkoxypolyethylene glycol mono(3-methyl-3-butenyl) ether, stearylalkoxypolyethylene glycol mono(3-methyl-3-butenyl) ether, phenoxypolyethylene glycol mono (3-methyl-3-butenyl) ether, naphthoxypolyethylene glycol mono(3-methyl-3-butenyl) ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl) ether, ethoxypolyethylene glycol mono(2-methyl-2-propenyl) ether, phenoxypolyethylene glycol mono (2-methyl-2-propenyl) ether and the like may be contained.

In the above-mentioned carboxylic acid constituent unit (II), suitable as the metal atom in $M^1$ in the above general formula (2) are univalent metal atom, for example alkali metal atom such as lithium, sodium and potassium; bivalent metal atom, for example alkaline earth metal atom such as calcium and magnesium. The organic ammonium is protonated organic amine, and suitable are alkanolammonium such as ethanolammonium, diethanolammonium and triethanolammonium; alkylammonium such as triethylammonium. Furthermore, the organic ammonium may be ammonium.

The carboxylic acid constituent unit (II) is preferably obtained by polymerization of a monomer (b) represented by the general formula (7);

(7)

(wherein $R^{17}$ represents a hydrogen atom, methyl group or —$COOM^{11}$, $M^{10}$ and $M^{11}$ may be the same or different and each represents a hydrogen atom, a univalent metal, a divalent metal, an ammonium or an organic ammonium). As for the metal atom in $M^{10}$ and $M^{11}$, the same as mentioned above referring to $M^1$ in the general formula (2) may be mentioned.

In the carboxylic acid polymer, the mole ratio between the constituent unit (I) and the constituent unit (II) ((I)/(II)) is not particularly limited, but preferably 1/99 to 80/20. More preferably, it is 5/95 to 40/60, still more preferably, it is 11/89 to 29/71.

Furthermore, as the method for producing the carboxylic acid polymer, copolymerizing the above constituent units (monomer components) with a polymerization initiator is suitable. The copolymerization method is as mentioned later.

As for the molecular weight of carboxylic acid polymer, the weight-average molecular weight (Mw) as determined by gel permeation chromatography (hereinafter referred to as "GPC") and expressed on the polyethylene glycol equivalent basis is preferably 3000 to 500000. When it is less than 3000, the water-reducing performance of the polycarboxylic acid dispersant may be insufficient, when it exceeds 500000, the water-reducing performance and fluidity of the polycarboxylic acid dispersant may be not sufficient. It is more preferably 4000 to 300000, still more preferably 5000 to 100000, most preferably 20000 to 90000. Additionally, the weight-average molecular weight of the polymer is a value determined under the GPC measurement conditions mentioned later.

In the present invention, the use of the polycarboxylic acid cement dispersant as described above makes it possible to produce a concrete product, and preferable methods of producing a concrete product involve a method comprising the process of curing under a condition of a temperature of 30° C. or more while using the polycarboxylic acid cement dispersant of the present invention, and a method comprising the process of curing by covering the periphery of a formwork with an insulating material (heat insulator) while using the polycarboxylic acid cement dispersant of the present invention, which producing methods are also within the present invention. These methods will be further described hereinafter. The embodiment using the polycarboxylic acid cement dispersant is as described later.

(Method Comprising the Process of Curing under a Condition of a Temperature of 30° C. or More)

The curing temperature is preferably 30° C. or more and 250° C. or less, more preferably 50° C. to 200° C. The whole concrete does not need to be in this temperature range and it is sufficient that a portion at the highest temperature in the concrete is in the above-mentioned temperature range during curing period. When the curing temperature is lower than 30° C., a long time for deforming is needed, when the curing temperature is higher than 250° C., a crack in concrete products is caused and this is not desired.

Also, a method of curing concrete under a condition of a temperature of 30° C. or more involves various methods, for example, a method such as to cover the periphery of poured concrete with a heat insulator and heat up by heat of hydration in progress, atmospheric pressure steam-curing such as to warm up and humidify under normal pressure by using steam with a boiler, and autoclave curing such as to use saturated steam at high temperature and high pressure in a pressure vessel.

(Method Comprising the Process of Curing by Covering the Periphery of a Formwork with an Insulating Material)

As for the insulating material, publicly known ones can be used, for example, organic insulating materials such as cork, cotton, felt, foam polystyrene and foam urethane, and inorganic insulating materials such as asbestos, glass wool and slag wool.

(Curing Process)

The above-mentioned curing may be performed through compacting processes after pouring concrete into a formwork. A compacting method involves various methods, for example, "compacting by vibration" such as to compact concrete by using a stick-form internal vibrator and an external vibrator installed on a formwork or a table on which a formwork is put, "centrifugal compacting" such as to compact by rotating a formwork, into which concrete is poured, on a centrifuge, and "pressure compacting" such as to compact by pressurizing concrete with a hydraulic device. Also, the curing may be performed not through the above-mentioned compacting processes but after pouring high-flow concrete as self-filling concrete into a formwork.

Thus, the use of the polycarboxylic acid cement dispersant of the present invention allows the manufacture of concrete products such that a high dispersing ability is exhibited and the turnover of a formwork is increased by deforming in early stages, whereby productivity is improved. Consequently, the effect of the present invention is sufficiently exhibited and the method of producing a concrete product can be performed by the following methods.

That is, a method of producing a concrete product, which makes use of a copolymer derived by using monomer components comprising a monomer (A) represented by the following general formula (3):

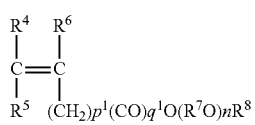

(wherein $R^4$, $R^5$ and $R^6$ may be the same or different and each represents a hydrogen atom or a methyl group; $p^1$ represents a number of 0 to 2; $q^1$ represents a number of 0 or 1; $R^7O$ may be the same or different and each represents an oxyalkylene group containing 2 to 18 carbon atoms; n represents the average molar number of addition of the oxyalkylene groups and is a number of 2 to 300; and $R^8$ represents a hydrogen atom or a hydrocarbon group containing 1 to 30 carbon atoms), a monomer (B) represented by the following general formula (4):

(wherein $R^9$ and $R^{10}$ maybe the same or different and each represents a hydrogen atom, a methyl group or —COOM$^4$, provided that $R^9$ and $R^{10}$ does not simultaneously represent —COOM$^4$; $R^{11}$ represents a hydrogen atom, a methyl group or —CH$_2$COOM$^5$, in which in the case where $R^{11}$ represents —CH$_2$COOM$^5$, $R^9$ and $R^{10}$ may be the same or different and each represents a hydrogen atom or a methyl group; and $M^3$, $M^4$ and $M^5$ may be the same or different and each represents a hydrogen atom, a monovalent metal, a divalent metal, ammonium or organic ammonium), and a monomer (C) represented by the following general formula (5):

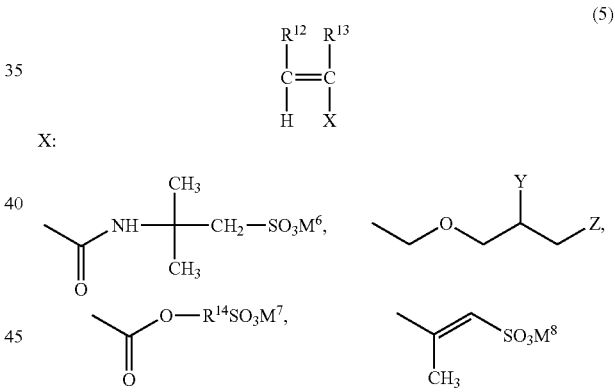

(wherein $R^{12}$ and $R^{13}$ maybe the same or different and each represents a hydrogen atom or a methyl group; Y and Z represent a hydroxyl group or —SO$_3$M$^9$, in which in the case where Y represents a hydroxyl group, Z represents —SO$_3$M$^9$, while in the case where Y represents —SO$_3$M$^9$, Z represents a hydroxyl group; $R^{14}$ represents an alkylene group containing 2 to 4 carbon atoms; and $M^6$, $M^7$, $M^8$ and $M^9$ may be the same or different and each represents a hydrogen atom, a monovalent metal, a divalent metal, ammonium or organic ammonium), wherein the mass ratio of the monomer (C) relative to the total monomer components is not less than 0.1% by mass and not more than 35% by mass, is also within the present invention.

The copolymer used in the above-mentioned method of producing a concrete product is the one used as a polycarboxylic acid cement dispersant. Specifically, the copolymer is the one derived by using monomer components comprising the monomer (A) as a polyalkylene glycol unsaturated monomer, the monomer (B) as an unsaturated carboxylic acid monomer, and the monomer (C) as a sulfonic acid group-containing monomer. The above monomer components may further contain, where necessary, another copolymerizable monomer (D) in addition to the monomer (A), (B) and (C).

The mass ratio of the monomer (C) relative to the total monomer components in the present invention is not less than 0.1% by mass and not more than 35% by mass. Namely, when the total amount of the whole monomers forming the copolymer is 100% by mass, the mass ratio of the above-mentioned monomer (C) is not less than 0.1% by mass and not more than 35% by mass. It is preferably not more than 20% by mass, more preferably not more than 10% by mass, still more preferably not more than 5% by mass. On the other hand, it is preferably not less than 0.2% by mass, more preferably not less than 0.5% by mass, still more preferably not less than 1% by mass. Additionally, when a sulfonic acid group-containing monomer as the above-mentioned monomer (D) is contained in addition to the monomer (C), the mass ratio of the whole sulfonic group-containing monomers relative to the total monomer components is preferably within the above-mentioned range.

Regarding the preferred mass ratio of the monomer components other than the monomer (C) relative to the total monomer components, the mass ratio of the monomer (A) relative to the total monomer components is preferably 98 to 40% by mass, the monomer (B) relative to the total monomer components is preferably 1 to 50% by mass, and the monomer (D) relative to the total monomer components is preferably 0 to 10% by mass.

In the general formula (3) providing the above-mentioned monomer (A), the case where $p^1$ is 0 denotes that a carbon atom and —(CO) $q^1$— are directly bonded, and the case where $p^1$ is 1 or 2 denotes that a divalent alkylene group containing 1 or 2 carbon atom. $p^1$ is preferably 0. In this case, when $q^1$ is 0, the above-mentioned monomer (A) is an unsaturated alcohol-polyalkylene glycol adduct, and when $q^1$ is 1, the above-mentioned monomer (A) is a polyalkylene glycol ester monomer.

The number of carbon atoms in the oxyalkylene group(s) represented by $R^7O$ in the general formula (3) is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition maybe of the random, block and/or alternating type, for instance. For securing a balance between the hydrophilicity and hydrophobicity, it is preferred that the methoxyalkylene group comprises the oxyethylene group as essential component. More preferably, the oxyethylene group is 50 mole % or more relative to the whole oxyalkylene group, still more preferably 90 mole % or more. Most preferably, the whole oxyalkylene groups are composed of oxyethylene group.

The average molar number n of addition of the oxyalkylene groups represented by the above $R^7O$ is suitably not less than 2 but not more than 300. When n is less than 2, sufficient levels of hydrophilicity and steric hindrance to disperse cement particles or the like may not be obtained, hence it may be impossible to obtain excellent fluidity. When n exceeds 300, the copolymerization reactivity may be insufficient. It is preferably not less than 5 and not more than 200, more preferably not less than 10 and not more than 150, still more preferably not less than 20 and not more than 100. Furthermore, the average molar number of addition means the average value for the molar number of the oxyalkylene group(s) in question forming each mole of monomer by addition.

As for the terminal group $R^8$ in the general formula (3), if the number of carbon atoms exceeds 30, no good dispersing ability can be obtained. From the viewpoint of dispersing ability, a preferred embodiment of $R^8$ is a hydrocarbon group containing 1 to 30 carbon atoms or a hydrogen, more preferably a hydrocarbon group containing 10 or less carbon atoms, still more preferably 3 or less carbon atoms, especially preferably 2 or less carbon atoms. Among the hydrocarbon groups, a saturated alkyl group and an unsaturated alkyl group are preferred. These alkyl groups may be straight chained or branched.

In the case where $p^1$ and $q^1$ is 0, the monomer (A) is an unsaturated alcohol-polyalkylene glycol adduct as mentioned above. Such an unsaturated alcohol-polyalkylene glycol adduct may be a compound having a structure such that a polyalkylene glycol chain is added to an alcohol having an unsaturated group. Suitable are vinyl alcohol-alkylene oxide adduct, (meth)allyl alcohol-alkylene oxide adduct, 3-buten-1-ol-alkylene oxide adduct, isoprene alcohol (3-methyl-3-buten-1-ol)-alkylene oxide adduct, 3-methyl-2-buten-1-ol-alkylene oxide adduct, 2-methyl-3-buten-2-ol-alkylene oxide adduct, 2-methyl-2-buten-1-ol-alkylene oxide adduct, and 2-methyl-3-buten-1-ol-alkylene oxide adduct, and the like.

Among these, preferable are polyethylene glycol monovinyl ether, polyethylene glycol monoallyl ether, polyethylene glycol mono(2-methyl-2-propenyl) ether, polyethylene glycol mono(2-butenyl) ether, polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl)ether, polyethylene-polypropylene glycol mono(3-methyl-3-butenyl) ether, methoxypolyethylene glycol mono (3-methyl-3-butenyl) ether, ethoxypolyethylene glycol mono(3-methyl-3-butenyl) ether, 1-propoxypolyethylene glycol mono (3-methyl-3-butenyl) ether, cyclohexyloxy-polyethylene glycol mono (3-methyl-3-butenyl) ether, 1-octyloxypolyethylene glycol mono(3-methyl-3-butenyl) ether, nonylalkoxypolyethylene glycol mono(3-methyl-3-butenyl) ether, laurylalkoxypolyethylene glycol mono(3-methyl-3-butenyl) ether, stearylalkoxypolyethylene glycol mono(3-methyl-3-butenyl) ether, phenoxypolyethylene glycol mono (3-methyl-3-butenyl) ether, naphthoxypolyethylene glycol mono(3-methyl-3-butenyl) ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl) ether, ethoxypolyethylene glycol mono(2-methyl-2-propenyl) ether, phenoxypolyethylene glycol mono (2-methyl-2-propenyl) ether and the like.

In the case where $p^1$ is 0 and $q^1$ is 1, the monomer (A) is a polyalkylene glycol ester monomer as mentioned above. Such a polyalkylene glycol ester monomer may be any of those monomers which have a structure in which an unsaturated group is bonded to a polyalkylene glycol chain via an ester bond. Suited for use are unsaturated carboxylic acid polyalkylene glycol ester compound, in particular (alkoxy) polyalkylene glycol mono(meth)acrylic ester.

Suitable as the (alkoxy)polyalkylene glycol mono(meth) acrylic ester may be the same as mentioned above referring to the monomer (a).

Suitable as the polyalkylene glycol ester monomer are also those (alkoxy)polyethylene glycol (poly)(alkylene glycol containing 2 to 4 carbon atoms) (meth)acrylate, which is the same as mentioned above referring to the monomer (a).

As the above-mentioned (alkoxy)polyalkylene glycol mono (meth) acrylate, not only the above-mentioned compounds, but also phenoxypolyethylene glycol mono(meth) acrylate, phenoxy{polyethylene glycol-(poly)propylene glycol} mono(meth)acrylate, phenoxy{polyethylene glycol-(poly)butylene glycol} mono(meth)acrylate, phenoxy{polyethylene glycol-(poly)propylene glycol-(poly)butylene glycol} mono(meth)acrylate, (meth)allyloxypolyethylene glycol mono(meth)acrylate, (meth)allyloxy{polyethylene glycol-(poly)propylene glycol} mono(meth)acrylate, (meth)allyloxy{polyethylene glycol-(poly)butylene glycol} mono(meth)acrylate and (meth) allyloxy{polyethylene glycol-(poly)propylene glycol-(poly) butylene glycol} mono (meth) acrylate are suitable.

Suitable as the above polyalkylene glycol ester monomer are also not only the (alkoxy)polyalkylene glycol mono (meth)acrylate but also (alkoxy)polyalkylene glycol monomaleate, (alkoxy)polyalkylene glycol dimaleate and the like. As such monomers, the following ones are suitable.

Half esters and diesters derived from alkylpolyalkylene glycols obtained by addition of 1 to 300 moles of an oxyalkylene containing 2 to 4 carbon atoms to an alcohol containing 1 to 22 carbon atoms or an amine containing 1 to 22 carbon atoms and the above-mentioned unsaturated dicarboxylic acid monomers; half esters and diesters derived from the above-mentioned unsaturated dicarboxylic acid monomers and polyalkylene glycols having an average molar number of addition of a glycol(s) containing 2 to 4 carbon atoms of 2 to 300; (poly)alkylene glycol di (meth) acrylates such as triethylene glycol di (meth) acrylate, (poly)ethylene glycol di(meth)acrylate, polypropylene glycol di(meth)acrylate, and (poly)ethylene glycol-(poly)propylene glycol di (meth) acrylate; (poly) alkylene glycol dimaleates such as triethylene glycol dimaleate and polyethylene glycol dimaleate.

Suitable as the metal atoms in $M^3$, $M^4$ and $M^5$ in the above general formula (4) providing the above-mentioned monomer (B) are univalent metal atoms, for example alkali metal atoms such as lithium, sodium and potassium; bivalent metal atoms, for example alkaline earth metal atoms such as calcium and magnesium. The organic ammonium is protonated organic amine, suitable as the organic ammonium are alkanol ammonium group such as an ethanol ammonium group, diethanol ammonium group and triethanol ammonium group, and a triethyl ammonium group. Further, it may be an ammonium group.

The monomer (B) represented by the general formula (4) may be any of those monomers which have a polymerizable unsaturated group and a group capable of forming a carbanion. Suited are an unsaturated monocarboxylic acid monomer and an unsaturated dicarboxylic acid monomer and the like.

The above unsaturated monocarboxylic acid monomer may be a monomer having one unsaturated group and one group capable of forming an carbanion within the molecule. Suitable are, for example, acrylic acid, methacrylic acid, crotonic acid and the like; monovalent metal salt, divalent metal salt, ammonium salt and organic ammonium salt thereof, and so forth.

The above-mentioned unsaturated dicarboxylic acid monomer may be any of those monomers which have one unsaturated group and two groups capable of forming a carbanion within the molecule. Suitable are maleic acid, itaconic acid, citraconic acid, fumaric acid and the like, and monovalent metal salt, divalent metal salt, ammonium salt and organic ammonium salt thereof, or anhydride thereof.

Among these, from the viewpoint of improvement in cement dispersing ability, (meth) acrylic acid; monovalent metal salt, divalent metal salt, ammonium salt and organic ammonium salt thereof are more preferably used.

In addition to these, also suitable as the above unsaturated carboxylic acid monomer (B) are half ester of unsaturated dicarboxylic acid monomer with an alcohol containing 1 to 22 carbon atoms, half amide of unsaturated dicarboxylic acid with an amine containing 1 to 22 carbon atoms, half ester of unsaturated dicarboxylic acid monomer with a glycol containing 2 to 4 carbon atoms, and half amide of maleamic acid with glycol containing 2 to 4 carbon atoms, and so forth.

Suitable as the monomer (C) represented by the general formula (5) in the copolymer used in the method for producing the concrete product are, for example, 2-acrylamido-2-methylpropane sulfonic acid and monovalent metal salt, divalent metal salt, ammonium salt and organic ammonium salt thereof; 2-hydroxy-3-allyloxysulfonic acid and monovalent metal salt, divalent metal salt, ammonium salt and organic ammonium salt thereof; sulfoalkyl(C2 to C4) (meth) acrylate such as sulfoethyl (meth) acrylate, sulfopropyl (meth) acrylate and sulfobutyl (meth) acrylate, and monovalent metal salt, divalent metal salt, ammonium salt and organic ammonium salt thereof; isoprenesulfonic acid and monovalent metal salt, divalent metal salt, ammonium salt and organic ammonium salt thereof. Suitable as the salt is monovalent metal salt. Furthermore, the sodium salts of these monomer (C) are respectively the following general formula (8) to (11).

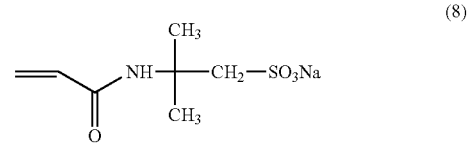
(8)

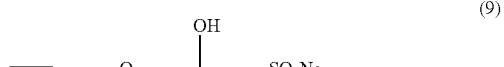
(9)

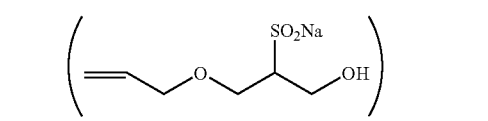
(10)

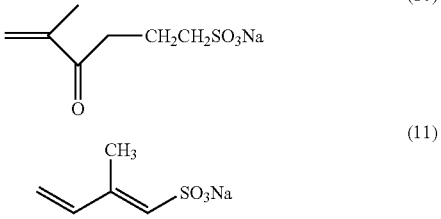
(11)

Suitable another copolymerizable monomer (D) in addition to the monomer (A), (B) and (C) are the following. These may be used singly or two or more of them may be used in combination.

Styrenes such as styrene, bromostyrene, chlorostyrene and methylstyrene; dienes such as 1,3-butadiene, isoprene and isobutylene; (meth)acrylic acid esters such as methyl (meth)acrylate, ethyl (meth)acrylate, butyl (meth)acrylate, pentyl (meth)acrylate, hexyl (meth)acrylate, decyl (meth) acrylate and lauryl (meth)acrylate; α-olefins such as hexene, heptene and decene; alkyl vinyl ethers such as methyl vinyl ether, ethyl vinyl ether and butyl vinyl ether; vinyl esters such as vinyl acetate; and allyl esters such as allyl acetate;

Diesters derived from the above unsaturated dicarboxylic acid monomers and alcohols containing 1 to 22 carbon atoms, diamides derived from the above unsaturated dicarboxylic acids and amines containing 1 to 22 carbon atoms and diesters derived from the above unsaturated dicarboxylic acid monomers and glycols containing 2 to 4 carbon atoms;

Bifunctional (meth)acrylates such as hexanediol di(meth)acrylate, trimethylolpropane tri(meth)acrylate, and trimethylolpropane di(meth)acrylate; unsaturated sulfonic acids, such as vinylsulfonate, (meth)allylsulfonate, 2-(meth)acryloxyethylsulfonate, 3-(meth)acryloxypropyl-sulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth)acryloxybutylsulfonate, (meth)acrylamidomethyl-sulfonic acid, (meth)acrylamidoethylsulfonic acid, 2-methylpropanesulfonic acid (meth)acrylamide and styrenesulfonic acid, as well as univalent metal salts, bivalent metal salts, ammonium salts and organic ammonium salts thereof;

Unsaturated amides such as (meth)acrylamide, (meth)acrylalkylamides, N-methylol(meth)acrylamide and N,N-dimethyl(meth)acrylamide; allyl compounds such as allyl alcohol; unsaturated amino compounds such as dimethylaminoethyl (meth)acrylate; vinyl ethers and allyl ethers, such as methoxypolyethylene glycol monovinyl ether, polyethylene glycol monovinyl ether, methoxypolyethylene glycol mono (meth) allyl ether and polyethylene glycol mono (meth) allyl ether;

(Meth)acrylate compounds such as hydroxyethyl (meth)acrylate, hydroxypropyl (meth)acrylate, methoxyethyl (meth) acrylate, ethoxyethyl (meth) acrylate, butoxyethylethyl (meth)acrylate, and methoxypropyl (meth)acrylate.

As the producing method of the copolymer used in the method of producing a concrete product, it is preferable to copolymerize the monomer (A), (B) and (C), where necessary, and further (D), with a polymerization initiator. The method of copolymerization is as mentioning later.

As for the molecular weight of the copolymer, the weight-average molecular weight (Mw) as determined by gel permeation chromatography (GPC) and expressed on the polyethyleneglycol equivalent basis is preferably 3000 to 500000. When it is less than 3000, the water-reducing performance of the dispersant may be insufficient, when it exceeds 500000, the water-reducing performance and fluidity of the polycarboxylic acid dispersant may be not sufficient. It is more preferably 4000 to 300000, still more preferably 5000 to 100000, most preferably 15000 to 60000. Additionally, the weight-average molecular weight of the polymer is a value determined under the GPC measurement conditions mentioned later.

Preferable methods of producing a concrete product involve a method (1) comprising the process of curing under a condition of a temperature of 30° C. or more, or a method (2) comprising the process of curing by covering the periphery of a formwork with an insulating material (heat insulator), which methods are also within the present invention. These methods are as the (Method Comprising the Process of Curing under a condition of a temperature of 30° C. or more), (Method Comprising the Process of Curing by Covering the Periphery of a Formwork with an Insulating Material), and (Curing Process) mentioned above.

Further, the method of producing (manufacturing) a concrete product of the present invention is preferably a method which using a polycarboxylic acid cement dispersant composed of the above-mentioned copolymer. The embodiment using this polycarboxylic acid cement dispersant is as described later.

In the polycarboxylic acid cement dispersant composed of the copolymer to be used in the above-mentioned method of producing a concrete product, for example, the above-mentioned penetration resistance value exponent and slump retention exponent can be used as an indicator of physical property evaluation in a cement composition using this cement dispersant. Each value of these indicators of physical property evaluation varies with an intended form; for example, it is preferable that penetration resistance value exponent is 60 MPa or more and slump retention exponent is 80% or more in the case of using for manufacturing a concrete product in factories. When the penetration resistance value exponent is less than 60 MPa or the slump retention exponent is less than 80%, hardening-retardation is not sufficiently inhibited and fluidity is not sufficiently improved; therefore, the effect of the present invention such that the turnover of a formwork is increased by deforming in early stages is not sufficiently exhibited and productivity may be not sufficiently improved. More preferably, the penetration resistance value exponent is 63 MPa or more and the slump retention exponent is 85% or more, still more preferably, the penetration resistance value exponent is 65 MPa or more and the slump retention exponent is 90% or more, especially preferably, the penetration resistance value exponent is 70 MPa or more and the slump retention exponent is 95% or more.

Now, the method of copolymerization, GPC measurement conditions, and the embodiment using the polycarboxylic acid cement dispersant are explained, furthermore, in the following.

(The Method of Copolymerization)

Regarding the method of producing the polycarboxylic acid polymer having the polyoxyalkylene ester constituent unit (I) and the carboxylic acid constituent unit (II) in the present invention, and the copolymer derived by using the monomer (A), (B) and (C) in the present invention, as the method of copolymerizing the monomer components, any known polymerization methods can be used, such as solution polymerization or bulk polymerization. The above copolymerization maybe carried out either batchwise or continuously. As the polymerization initiator used in the copolymerization, the known ones can be used and suitable are persulfate salts such as ammonium persulfate, sodium persulfate and potassium persulfate; hydrogen peroxide; azo compounds such as azobis-2-methylpropionamidine hydrochloride and azoisobutyronitrile; peroxides such as benzoyl peroxide, lauroyl peroxide and cumene hydroperoxide; and so forth. Further, as the promoter, reducing agents such as sodium hydrogensulfite, sodium sulfite, Mohr's salt, sodium pyrobisulfite, formaldehyde sodium sulfoxylate and ascorbic acid; and amine compounds such as ethylenediamine, sodium ethylenediaminetetraacetate and glycine, etc. can be used in combination. These polymerization initiators and promoters may be used singly or two or more species may be used in combination.

In the above method of copolymerization, a chain transfer agent may be used according to need. Usable as such chain transfer agent are one or two or more species of those known in the art. The use of a hydrophobic chain transfer agent is preferred, however. Suitable as the above hydrophobic chain transfer agent are thiol compounds having a hydrocarbon group containing not less than 3 carbon atoms or compounds whose solubility in water at 25° C. is not more than 10%. Suitable are the chain transfer agents mentioned above, thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol, and dodecyl mercaptan; halides such as carbon tetrachloride, carbon tetrabromide, methylene chloride, bromoform, and bromotrichloroethane; unsaturated hydrocarbon compounds such as α-methylstyrene dimer, α-terpinene, γ-terpinene, dipentene, and terpinolene; and the like. These may be used singly or two or more species may be used in combination. Among them, thiol chain transfer agents having a hydrocarbon group containing not less than 3 carbon atoms are preferably contained.

The above hydrophobic chain transfer agent may be used in combination with one or two or more hydrophilic chain transfer agents, if necessary. As such hydrophilic chain transfer agents, those known in the art can be used. Suitable as such are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof.

As for the method of adding the above chain transfer agent to the reaction vessel, such a continuous charging method as dripping and divided charging can be applied. The chain transfer agent may be introduced singly into the reaction vessel, or it may be admixed in advance with the monomer having an oxyalkylene group or solvent and/or the like.

As the solvent which is used where necessary in the step of copolymerization, any of known ones may be used and suitable are water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more species may be used in combination. Among them, one or two or more solvents selected from the group consisting of water and lower alcohols containing 1 to 4 carbon atoms are preferably used from the viewpoint of solubility of the monomer components and the product polycarboxylic acid polymer.

As for the method of adding the monomer components, polymerization initiator, etc. to the reaction vessel in the above-mentioned method of copolymerization, suitable are the method comprising charging the reaction vessel with all monomer components and then adding the polymerization initiator thereto to conduct copolymerization; the method comprising charging the reaction vessel with some of monomer components and then adding the polymerization initiator and residual monomer components thereto to conduct copolymerization; and the method comprising charging the reaction vessel with the polymerization solvent and then adding the whole amount of the monomers and polymerization initiator thereto are suitable. Among such methods, the method comprising carrying out the copolymerization by adding dropwise the polymerization initiator and monomers successively to the reaction vessel is preferred since the molecular weight distribution of the product copolymer can be made narrow (sharp) and the cement dispersibility for increasing the fluidity of cement compositions and the like can be improved thereby. Furthermore, the copolymerization reaction is preferably carried out with maintaining the density of water in the reaction vessel during the copolymerization to not more than 85% since the preservation stability of the obtained polymer is more improved by the improvement of the copolymerizability of the monomer components. More preferably, it is not more than 60%, still more preferably not more than 50%.

In the above method of copolymerization, the copolymerization temperature and other copolymerization conditions are appropriately selected according to the copolymerization method, solvent, polymerization initiator, and chain transfer agent employed. It is generally preferred that the copolymerization temperature be not lower than 0° C. and not higher than 150° C. More preferably, it is not lower than 40° C., still more preferably not lower than 50° C., especially preferably not lower than 60° C., while it is more preferably not higher than 120° C., still more preferably not higher than 100° C., especially preferably not higher than 85° C.

The copolymer obtained by the above method of copolymerization as such can be used as the main component of polycarboxylic acid cement dispersant, or as the copolymer used in the method of producing a concrete product. Where necessary, it may be used after further neutralization with an alkaline substance. Preferably used as the alkaline substance is inorganic salt such as monovalent and divalent metal hydroxide, chloride and carbonate; ammonia; and organic ammonium, etc.

In the above method of copolymerization, the copolymerization of the monomer components is preferably carried out at a degree of neutralization of the above carboxylic acid constituent unit (II) (or the monomer (B)) of 0 to 60 mole %. The degree of neutralization of the carboxylic acid constituent unit (II) (or the monomer (B)) is expressed in terms of the mole % of the carboxylic acid constituent unit (II) (or the monomer (B)) in a salt form with the total number of moles of the carboxylic acid constituent unit (II) (or the monomer (B)) being taken as 100 mole %. When the degree of neutralization of the carboxylic acid constituent unit (II) (or the monomer (B)) exceeds 60 mole %, the degree of polymerization in the copolymerization step will not rise, hence the product polymer may possibly have a lower molecular weight and the production efficiency may possibly decrease. More preferably, it is not more than 50 mole %, still more preferably not more than 40 mole %, still more preferably not more than 30 mole %, especially preferably not more than 20 mole %, most preferably not more than 10 mole %.

Suitable as the method of carrying out the copolymerization using the above carboxylic acid constituent unit (II) (or the monomer (B)) at a degree of neutralization of 0 to 60 mole % are the method comprising subjecting the all acid form carboxylic acid constituent unit (II) (or the monomer (B)), namely the whole carboxylic acid constituent unit (II) (or the monomer (B)) in which $M^1$ in the general formula (2) (or $M^3$ in the general formula (4)) is a hydrogen atom, to copolymerization without neutralization, and the method comprising subjecting the carboxylic acid constituent unit (II) (or the monomer (B)) to copolymerization after neutralization with an alkaline substance to the form of a salt, such as sodium salt or ammonium salt and the like, at a degree of neutralization of 0 to 60 mole %.

(GPC Molecular Weight Measurement Conditions)
Column used: Tosoh TSK guard column SWXL+TSK gel G4000SWXL+G3000SWXL+G2000SWXL
Eluent: Sodium acetate trihydrate (115.6 g) is dissolved in a mixed solvent composed of 10999 g of water and 6001 g of acetonitrile, and the solution is further adjusted to pH 6.0 with acetic acid and used as the solution of the eluent.
Injection volume: 100 µL of the 0.5% solution of the eluent
Eluent flow rate: 0.8 mL/min
Column temperature: 40° C.
Standard samples: Polyethylene glycol, peak-top molecular weights (Mp) 272500, 219300, 85000, 46000, 24000, 12600, 4250, 7100, 1470
Order of Calibration curve: 3rd-order
Detector: Waters, Japan's 410 differential refractive index detector
Analysis software: Waters, Japan's MILLENNIUM Ver. 3.21

(The Embodiment Using the Polycarboxylic Acid Cement Dispersant)

The polycarboxylic acid cement dispersant of the present invention, or the polycarboxylic acid cement dispersant composed of the copolymer used in the method of producing a concrete product can be added to cement compositions such as cement paste, mortar, concrete or the like and used. Suitable as the above cement composition are ones in general use which contain cement, water, fine aggregate, coarse aggregate and so on. These may be added with fine powders, such as fly ash, blast-furnace slag, silica fume, liquid silica fume and limestone. More preferably, they can be added to concrete and used. The preferred embodiment (form) is, for example, a form of producing a concrete product by using the concrete and the above-mentioned cement dispersant. Such a producing method of a concrete product is a suitable form for carrying out the present invention.

The above-mentioned concrete contains cement, water, fine aggregate (sand, etc.) and coarse aggregate (crushed stone, etc.) as the main components. Suited as the cement are portland cement species (ordinary, high-early-strength, ultra high-early-strength, moderate heat, sulfate persisting, and low alkali grade thereof), various blended cement species (blast furnace slag cement, silica cement, fly ash cement), white portland cement, alumina cement, ultra rapid hardening cement (one clinker ultra rapid hardening cement, two clinker ultra rapid hardening cement, magnesium phosphate cement), grouting cement, oil-well cement, lower calorific value cement (lower calorific value blast furnace slag cement, fly ash-mixed lower calorific value blast furnace slag cement, high belite cement), ultrahigh strength cement, cement-based hardening material, and economical cement (cement produced by using at least one of municipal refuse incineration ash and sewage sludge incineration ash as a material). Fine powders such as blast furnace slag, fly ash, cinder ash, clinker ash, husk ash, silica fume, silica powder and limestone powder, and gypsum may further be added. Usable as the aggregate are gravel, crushed stone, water granulated blast furnace slag, recycled concrete aggregate and, further, fireproof aggregates such as silica stone-based, clay-based, zircon-based, high alumina, silicon carbide-based, graphite-based, chrome-based, chrome-magnesite, and magnesia-based ones.

As for the unit water amount, the amount of cement and the water/cement ratio in each cubic meter of the above concrete, the unit water amount of 100 to 185 kg/m$^3$, the amount of cement as used of 250 to 800 kg/m$^3$, and the water/cement ratio (mass ratio) of 0.1 to 0.7 are preferred. More preferably, the unit water amount of 120 to 175 kg/m$^3$, the amount of cement as used of 270 to 800 kg/m$^3$, and the water/cement ratio (mass ratio) of 0.2 to 0.65 are recommended for wide use in poor to rich mixtures. Such concrete product can be used in a high water reducing ratio range, namely a range where a water/cement ratio (by mass) is low, such as 0.15 to 0.5% by mass (preferably 0.15 to 0.4% by mass). Further, it can be used effectively for high strength concrete with a high unit cement amount and low water/cement ratio, and poor concrete with the unit cement amount of 300 kg/m$^3$ or lower.

The amount of addition of the above-mentioned cement dispersant in the above concrete is preferably 0.01 to 10.0% by mass based on the mass of cement calculated on the solid content basis. Consequently, various favorable effects, such as reduction in unit water amount, increase in strength in early stages and improvement in dispersing ability, are realized. When the above addition amount is lower than 0.01%, the performance characteristics may not become sufficient. Conversely, when it exceeds 10.0%, the effects will substantially reach the peak and this maybe disadvantageous from the economical viewpoint. It is more preferably 0.02 to 5.0% by mass, still more preferably 0.05 to 3.0% by mass, particularly preferably 0.1 to 2.0% by mass.

The above-mentioned cement dispersant can be used in combination with known cement additives (ingredients). As the cement additives, those known cement additives shown below are suitable. In cases when the known cement additives (ingredients) are used, the formulation mass amount between the polycarboxylic acid cement dispersant of the present invention (or the copolymer used in the method of producing a concrete product) and the known cement additives (ingredients) is preferably within the range of 1 to 99/99 to 1, more preferably 5 to 95/95 to 5, further preferably 10 to 90/90 to 10, although it cannot be definitely determined according to the known cement additives (ingredients) species and mix formulation employed, the test conditions and other factors.

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl (meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta (methylenephosphonic acid) and alkali metal salts and alkaline earth metal salts of these; and the like;

(4) High-early-strength agents or accelerators; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil antifoaming agents; kerosene, liquid paraffin, etc.;

(6) Fat or oil antifoaming agents; animal/vegetable oils, sesame oil, castor oil, alkylene oxide adducts derived from these, and the like;

(7) Fatty acid antifoaming agents; oleic acid, stearic acid, alkylene oxide adducts derived from these, and the like;

(8) Fatty acid ester antifoaming agents; glycerin monoricinolate, alkenylsuccinic acid derivatives, sorbitol monolaurate, sorbitol trioleate, natural waxes, etc.;

(9) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl) aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;

(12) Phosphate ester antifoaming agents; tributyl phosphate, sodium octyl phosphate, etc.;

(13) Metal soap antifoaming agents; aluminum stearate, calcium oleate, etc.;

(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(15) AE (air-entraining) agents; resin soaps, saturated or unsaturated fatty acids, sodium hydroxystearate, lauryl sulfate, ABS (alkylbenzenesulfonates), LAS (linear alkylbenzenesulfonates), alkanesulfonates, polyoxyethylene alkyl(phenyl) ethers, polyoxyethylene alkyl(phenyl) ether sulfates and salts thereof, polyoxyethylene alkyl (phenyl) ether phosphates and salts thereof, proteinous materials, alkenylsulfosuccinic acids, α-olefinsulfonates, etc.;

(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(17) Water-proof agents; fatty acids (salts), fatty acid esters, fats and oils, silicones, paraffins, asphalts, waxes, etc.;

(18) Corrosion inhibitors; nitrite salts, phosphate salts, zinc oxide, etc.;

(19) Crack inhibitors; polyoxyalkyl ethers; alkanediols such as 2-methyl-2,4-pentanediol; etc.;

(20) Expansive additives; ettringite materials, coals, etc.

As other known cement additives (ingredients), there may be mentioned cement wetting agents, thickening agents, segregation inhibitors, flocculants, agents to reduce drying shrinkage, agents to increase strength, self-leveling agents, corrosion inhibitors, color difference agents, antifungal agents, blast-furnace slag, fly ash, cinder ash, clinker ash, husk ash, silica fume, silica powder, gypsum and so forth. These known cement additives (ingredients) may be used singly or two or more of them may be used in combination.

The above-mentioned cement dispersant may be used in combination not only with the above-mentioned cement additives (ingredients) but also with additives for improving dispersing ability, strength in early stages and the like of concrete products.

The polycarboxylic acid cement dispersant of the present invention which has the constitution described hereinabove, can exhibit a high dispersing ability. Further, in the case of producing concrete products, the turnover of a formwork is increased by deforming in early stages to improve productivity, whereby working efficiency can be improved in constructing civil engineering and construction structures superior in basic performances. Also, the method of producing concrete products of the present invention allows the manufacture of concrete products such that a high dispersing ability is exhibited and the turnover of a formwork is increased by deforming in early stages to improve productivity, whereby working efficiency can be improved in constructing civil engineering and construction structures superior in basic performances.

BEST MODE FOR CARRYING OUT THE INVENTION

The present invention is more specifically described below by way of the Examples. It must be noted, however, that the invention is not limited to these Examples alone. In the Examples, "part(s)" means "part (s) by mass" and "%" denotes "% by mass", unless otherwise specified.

PRODUCTION EXAMPLE 1

Production of Cement Dispersant (1)

A glass-made reaction vessel equipped with a thermometer, a stirrer, a dropping funnel, a nitrogen inlet tube, and a reflux condenser was charged with 149.5 parts of water, the reaction vessel inside was purged with nitrogen with stirring, and then heated to 80° C. in a nitrogen atmosphere. Then, 120.49 parts of an aqueous monomer medium composed of 55.29 parts of methoxypolyethylene glycol monomethacrylate (PGM-100AE: the average molar number of addition of the ethylene oxides is 100), 4.71 parts of acrylic acid (AA), 60 parts of water, and 0.49 parts of 3-mercaptopropionic acid as chain transfer agent were added dropwise over 4 hours, and 30 parts of an aqueous solution prepared by dissolving 0.69 parts of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (1) of the present invention composed of a polymer aqueous solution with a weight-average molecular weight of 46500.

COMPARATIVE PRODUCTION EXAMPLE 1

Production of Comparative Cement Dispersant (1)

A glass-made reaction vessel equipped with a thermometer, a stirrer, a dropping funnel, a nitrogen inlet tube, and a reflux condenser was charged with 99.97 parts of water, the reaction vessel inside was purged with nitrogen with stirring, and then heated to 80° C. in a nitrogen atmosphere. Then, 168.75 parts of an aqueous monomer medium composed of 113.3 parts of methoxypolyethylene glycol monomethacrylate (PGM-23AE: the average molar number of addition of the ethylene oxides is 23), 21.7 parts of acrylic acid (AA), 33.35 parts of water, 0.4 parts of a 30% aqueous solution of sodium hydroxide and 1.29 parts of 3-mercaptopropionic acid as chain transfer agent were added dropwise over 4 hours, and 30 parts of an aqueous solution prepared by dissolving 1.55 parts of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a comparative cement dispersant (1) composed of a polymer aqueous solution with a weight-average molecular weight of 19000.

COMPARATIVE PRODUCTION EXAMPLE 2

Production of Comparative Cement Dispersant (2)

A glass-made reaction vessel equipped with a thermometer, a stirrer, a dropping funnel, a nitrogen inlet tube, and a reflux condenser was charged with 90 parts of water, the reaction vessel inside was purged with nitrogen with stirring, and then heated to 50° C. in a nitrogen atmosphere. Then, 150.33 parts of an aqueous monomer medium composed of 53.87 parts of methoxypolyethylene glycol monomethacrylate (PGM-90E: the average molar number of addition of the ethylene oxides is 90), 53.87 parts of methacrylic acid (MAA), 90 parts of water, and 0.33 parts of 3-mercaptopropionic acid as chain transfer agent were added dropwise over 4 hours, and 30 parts of an aqueous solution prepared by dissolving 0.23 parts of hydrogen peroxide and 30 parts of an aqueous solution prepared by dissolving 0.3 parts of L-ascorbic acid were added dropwise over 5 hours. Thereafter, the temperature was further maintained at 50° C. for 1 hour to drive the polymerization reaction to completion. The reaction mixture was then neutralized top H7.0 with a 30% aqueous solution of sodium hydroxide to give a comparative cement dispersant (2) composed of a polymer aqueous solution with a weight-average molecular weight of 65200.

The compositions of the cement dispersants obtained by Production Example 1, Comparative Production Example 1 and 2 are shown in Table 1.

TABLE 1

| | | | | Composition (% by mass) | | Molecular weight |
|---|---|---|---|---|---|---|
| | Dispersant | Ester | Acid | Ester | Acid | |
| Production Ex. 1 | Cement dispersant (1) | PGM-100AE | AA | 90 | 10 | 46500 |
| Comparative Production Ex. 1 | Comparative cement dispersant (1) | PGM-23AE | AA | 80 | 20 | 19000 |
| Comparative Production Ex. 2 | Comparative cement dispersant (2) | PGM-90E | MAA | 87.5 | 12.5 | 64000 |

Physical Property Evaluation

Mortar to which each of a cement dispersant (1) of the present invention and comparative cement dispersants (1) and (2) for comparison was added was prepared so as to measure a penetration resistance value and a flow value. Materials and mortar compounding used for testing are as follows.

(Materials and Mortar Compounding)

European standard cement (CEM I 52.5): 500 g

Fine aggregate (standard sand for cement strength test, made by Japan Cement Association: JIS R5201): 1350 g Deionized water containing a cement dispersant of the present invention or a comparative cement dispersant and an antifoaming agent (trade name "MA404", made by NMB, Addition amount: 2% by mass of a 30% by mass aqueous solution of MA404 relative to the mass of cement (100% by mass of cement): 200 g The addition amount of each cement dispersant (% by mass of solid content relative to cement): shown in Table 2

(Penetration Resistance Value)

A penetration resistance value was measured by a method as described above (Method of Measuring Penetration Resistance Value Exponent).

A method of curing test specimen for the measuring penetration resistance value was performed in the following three kinds of manners.
A: Mortar is charged into a plastic container and, then, stands in a thermoregulator retained at a temperature of 20° C.
B: Mortar is charged into a plastic container and, then, stands in a water bath retained at a temperature of 40° C.
C: Mortar is charged into a glass container to thermally insulate the periphery with foam polystyrene and, then, stands in a room at a temperature of 20° C.

The penetration resistance value was measured in the following manner.

With regard to A, it was measured after 5 hours, 6 hours and 7 hours. With regard to B, it was measured after 3.5 hours, and with regard to C, it was measured after 5 hours.

(Flow value)

A flow value immediately after mixing mortar, namely, after 0 minute was measured with regard to a flow value (mm).

The cement dispersant (1) of the present invention was used in Examples 1 to 3 to perform experiments by applying curing methods A, B and C to Examples 1 to 3 (that is, curing method A in Example 1, curing method B in Example 2, curing method C in Example 3), respectively. Also, The comparative cement dispersants (1) and (2) were used in Comparative Examples 1 and 2 (that is, comparative cement dispersant (1) in Comparative Example 1, comparative cement dispersant (2) in Comparative Example 2), respectively, and curing was performed by curing method A in both of them. Each result is shown in Table 2.

curing under the conditions of a temperature of 30° C. or more or curing by covering the periphery of a formwork with a heat insulator while using the polycarboxylic acid cement dispersant (1) used in Example 1, the time for obtaining deformable strength can be shortened and the turnover of a formwork is increased so as to improve productivity.

(Change with Time of Flow Value)

With regard to Example 1, a flow value (mm) was measured after 0 minute, 15 minutes, 30 minutes, 45 minutes and 60 minutes. The results are shown in Table 3.

TABLE 3

|  | Flow(mm) |
| --- | --- |
| After 0 min | 218 |
| After 15 min | 203 |
| After 30 min | 184 |
| After 45 min | 160 |
| After 60 min | 151 |

Also, a slump retention exponent was calculated from an initial mortar flow value (a mortar flow value after 0 minute) and a mortar flow value after 30 minutes by using the following expression;

Slump retention exponent (%)=100×(mortar flow value after 30 minutes)/(initial mortar flow value).

The result was 84.4%.

PRODUCTION EXAMPLE 2

Production of Cement Dispersant (2)

A glass-made reaction vessel equipped with a thermometer, a stirrer, a dropping funnel, a nitrogen inlet tube, and a reflux condenser was charged with 100.03 g of water, the

TABLE 2

| Dispersant | Addition amount | Flow (mm) | Penetration resistance value (MPa) | | | | Curing method |
| --- | --- | --- | --- | --- | --- | --- | --- |
| | | | 3.5 h | 5 h | 6 h | 7 h | |
| Example 1 | Cement dispersant (1) | 0.35 | 218 | — | 9.1 | 26.2 | 64.6 | A |
| Example 2 | Cement dispersant (1) | 0.35 | 218 | 42.2 | — | — | — | B |
| Example 3 | Cement dispersant (1) | 0.35 | 218 | — | 24.8 | — | — | C |
| Comparative Ex. 1 | Comparative cement dispersant (1) | 0.25 | 221 | — | 6 | 17.5 | 52.4 | A |
| Comparative Ex. 2 | Comparative cement dispersant (2) | 0.23 | 210 | — | 7.3 | 21.6 | 45.5 | A |

In the above-mentioned table, "Flow (mm)" is a flow value immediately after mixing mortar, namely, after 0 minute. Also, in the table, A, B and C denote the above-mentioned curing methods.

It is understood from Table 2 that the polycarboxylic acid cement dispersant (1) of the present invention used in Example 1 has a penetration resistance value exponent of 64.6 MPa.

Also, it is apparent from the results of Table 2 that a high penetration resistance value is denoted in a shorter time than the case without any devices (curing method A) by heating test specimen (curing method B) or thermally insulating the periphery (curing method C). That is to say, by means of reaction vessel inside was purged with nitrogen with stirring, and then heated to 80° C. in a nitrogen atmosphere. Then, 168.75 g of an aqueous monomer medium composed of 112.98 g of methoxypolyethylene glycol monoacrylate (PGM-23AE: Made of Shinakamurakagaku, NKester, AM-230G, the average molar number of addition of the ethylene oxides is 23), 19.2 g of acrylic acid (AA), 2.82 g of 2-acrylamide-2-methylpropane sulfonic acid sodium (AMPS-Na), 33.38 g of water, 0.37 g of a 30% aqueous solution of sodium hydroxide, and 1.21 g of 3-mercapto-propionic acid as chain transfer agent were added dropwise over 4 hours, and 30 g of an aqueous solution prepared by dissolving 1.55 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (2) composed of a copolymer aqueous solution with a weight-average molecular weight of 17800.

PRODUCTION EXAMPLE 3

Production of Cement Dispersant (3)

A glass-made reaction vessel equipped with a thermometer, a stirrer, a dropping funnel, a nitrogen inlet tube, and a reflux condenser was charged with 99.92 g of water, the reaction vessel inside was purged with nitrogen with stirring, and then heated to 80° C. in a nitrogen atmosphere. Then, 168.75 g of an aqueous monomer medium composed of 106.76 g of methoxypolyethylene glycol monoacrylate (PGM-23AE: Made of Shinakamurakagaku, NKester, AM-230G, the average molar number of addition of the ethylene oxides is 23), 21.12 g of acrylic acid (AA), 7.12 g of 2-acrylamide-2-methylpropane sulfonic acid sodium (AMPS-Na), 33.32 g of water, 0.43 g of a 30% aqueous solution of sodium hydroxide, and 1.34 g of 3-mercaptopropionic acid as chain transfer agent were added dropwise over 4 hours, and 30 g of an aqueous solution prepared by dissolving 1.55 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (3) composed of a copolymer aqueous solution with a weight-average molecular weight of 15300.

PRODUCTION EXAMPLE 4

Production of Cement Dispersant (4)

A glass-made reaction vessel equipped with a thermometer, a stirrer, a dropping funnel, a nitrogen inlet tube, and a reflux condenser was charged with 149.57 g of water, the reaction vessel inside was purged with nitrogen with stirring, and then heated to 80° C. in a nitrogen atmosphere. Then, 120.43 g of an aqueous monomer medium composed of 52.22 g of methoxypolyethylene glycol monoacrylate (PGM-100AE: the average molar number of addition of the ethylene oxides is 100), 4.7 g of acrylic acid (AA), 3.07 g of 2-hydroxy-3-allyloxy-1-propane sulfonic acid sodium (HAPS), 60 g of water, and 0.43 g of 3-mercaptopropionic acid as chain transfer agent were added dropwise over 4 hours, and 30 g of an aqueous solution prepared by dissolving 0.69 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (4) composed of a copolymer aqueous solution with a weight-average molecular weight of 47100.

PRODUCTION EXAMPLE 5

Production of Cement Dispersant (5)

A glass-made reaction vessel equipped with a thermometer, a stirrer, a dropping funnel, a nitrogen inlet tube, and a reflux condenser was charged with 149.47 g of water, the reaction vessel inside was purged with nitrogen with stirring, and then heated to 80° C. in a nitrogen atmosphere. Then, 120.53 g of an aqueous monomer medium composed of 52.22 g of methoxypolyethylene glycol monoacrylate (PGM-100AE: the average molar number of addition of the ethylene oxides is 00), 4.7 g of acrylic acid (AA), 3.07 g of sodium sulfoethyl methacylate (SEMS), 60 g of water, and 0.1 g of 3-mercaptopropionic acid as chain transfer agent were added dropwise over 4 hours, and 30 g of an aqueous solution prepared by dissolving 0.69 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (5) composed of a copolymer aqueous solution with a weight-average molecular weight of 41400.

PRODUCTION EXAMPLE 6

Production of Cement Dispersant (6)

A glass-made reaction vessel equipped with a thermometer, a stirrer, a dropping funnel, a nitrogen inlet tube, and a reflux condenser was charged with 149.9 g of water, the reaction vessel inside was purged with nitrogen with stirring, and then heated to 80° C. in a nitrogen atmosphere. Then, 120.1 g of an aqueous monomer medium composed of 52.22 g of methoxypolyethylene glycol monoacrylate (PGM-100AE: the average molar number of addition of the ethylene oxides is 100), 4.7 g of acrylic acid (AA), 3.07 g of isoprenesulfonic acid sodium (IPS), 60 g of water, and 0.1 g of 3-mercaptopropionic acid as chain transfer agent were added dropwise over 4 hours, and 30 g of an aqueous solution prepared by dissolving 0.69 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a cement dispersant (6) composed of a copolymer aqueous solution with a weight-average molecular weight of 41900.

COMPARATIVE PRODUCTION EXAMPLE 3

Production of Comparative Cement Dispersant (3)

A glass-made reaction vessel equipped with a thermometer, a stirrer, a dropping funnel, a nitrogen inlet tube, and are flux condenser was charged with 99.97 g of water, the reaction vessel inside was purged with nitrogen with stirring, and then heated to 80° C. in a nitrogen atmosphere. Then, 168.75 g of an aqueous monomer medium composed of 113.3 g of methoxypolyethylene glycol monoacrylate (PGM-23AE: the average molar number of addition of the ethylene oxides is 23), 21.7 g of acrylic acid (AA), 33.35 g of water, 0.4 g of a 30% aqueous solution of sodium hydroxide, and 1.29 g of 3-mercaptopropionic acid as chain transfer agent were added dropwise over 4 hours, and 30 g of an aqueous solution prepared by dissolving 1.55 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a comparative cement dispersant (3) composed of a copolymer aqueous solution with a weight-average molecular weight of 19000.

COMPARATIVE PRODUCTION EXAMPLE 4

Production of Comparative Cement Dispersant (4)

A glass-made reaction vessel equipped with a thermometer, a stirrer, a dropping funnel, a nitrogen inlet tube, and a reflux condenser was charged with 149.5 g of water, the reaction vessel inside was purged with nitrogen with stirring, and then heated to 80° C. in a nitrogen atmosphere. Then, 120.49 g of an aqueous monomer medium composed of 55.29 g of methoxypolyethylene glycol monoacrylate (PGM-23AE: the average molar number of addition of the ethylene oxides is 23), 4.71 g of acrylic acid (AA), 60 g of water, and 0.49 g of 3-mercaptopropionic acid as chain transfer agent were added dropwise over 4 hours, and 30 g of an aqueous solution prepared by dissolving 0.69 g of ammonium peroxodisulfate was added dropwise over 5 hours. Thereafter, the temperature was further maintained at 80° C. for 1 hour to drive the polymerization reaction to completion. The reaction mixture was then neutralized to pH 7.0 with a 30% aqueous solution of sodium hydroxide to give a comparative cement dispersant (4) composed of a copolymer aqueous solution with a weight-average molecular weight of 46500.

COMPARATIVE PRODUCTION EXAMPLE 5

Production of Comparative Cement Dispersant (5)

A glass-made reaction vessel equipped with a thermometer, a stirrer, a dropping funnel, a nitrogen inlet tube, and a reflux condenser was charged with 339.6 g of water, the reaction vessel inside was purged with nitrogen with stirring, and then heated to 80° C. in a nitrogen atmosphere. Then, 503.5 g of an aqueous monomer medium composed of 333.6 g of methoxypolyethylene glycol monomethacrylate (PGM-25E: the average molar number of addition of the ethylene oxides is 25), 66.4 g of methacrylic acid (MAA), 100 g of water, and 3.5 g of 3-mercaptopropionic acid as chain transfer agent were added dropwise over 4 hours, and 46 g of an aqueous solution prepared by dissolving 4.6 g of ammonium peroxodisulfate was added dropwise over 5 hours. Thereafter, the temperature was further maintained at 80° C. for 1 hour to drive the polymerization reaction to completion. The reaction mixture was then neutralized to pH 7 with a 30% aqueous solution of sodium hydroxide to give a comparative cement dispersant (5) composed of a copolymer aqueous solution with a weight-average molecular weight of 23800.

The compositions of the cement dispersants obtained by Production Examples 2 to 6, and Comparative Production Examples 3 to 5 are shown in Table 4.

TABLE 4

| | Dispersant | Ester | Acid | Sulfonic acid | Ester | Acid | Sulfonic acid | Molecular weight |
|---|---|---|---|---|---|---|---|---|
| | | | | Composition (% by mass) | | | | |
| Production Ex. 2 | Cement dispersant (2) | PGM-23AE | AA | AMPS-Na | 80 | 18 | 2 | 17800 |
| Production Ex. 3 | Cement dispersant (3) | PGM-23AE | AA | AMPS-Na | 75 | 20 | 5 | 15300 |
| Production Ex. 4 | Cement dispersant (4) | PGM-100AE | AA | HAPS | 85 | 10 | 5 | 47100 |
| Production Ex. 5 | Cement dispersant (5) | PGM-100AE | AA | SEMS | 85 | 10 | 5 | 41400 |
| Production Ex. 6 | Cement dispersant (6) | PGM-100AE | AA | IPS | 85 | 10 | 5 | 41900 |
| Comparative Production Ex. 3 | Comparative cement dispersant (3) | PGM-23AE | AA | — | 80 | 20 | — | 19000 |
| Comparative Production Ex. 4 | Comparative cement dispersant (4) | PGM-100AE | AA | — | 90 | 10 | — | 46500 |
| Comparative Production Ex. 5 | Comparative cement dispersant (5) | PGM-25E | MAA | — | 80 | 20 | — | 23800 |

Physical Property Evaluation

Mortar to which each of cement dispersants (2) to (6) of the present invention and comparative cement dispersants (3) to (5) for comparison was added was prepared so as to measure a penetration resistance value and a flow value. Materials and mortar compounding used for testing, Penetration resistance value, Flow value, and A method of curing test specimen for the measuring penetration resistance value are as mentioned above. Furthermore, the addition amount of each cement dispersant (% by mass of solid content relative to cement) is shown in Table 5.

The cement dispersant (2) was used in Examples 4 to 6, the cement dispersant (3) was used in Examples 7 to 9, the cement dispersant (4) was used in Examples 10 to 12, the cement dispersant (5) was used in Example 13, the cement dispersant (6) was used in Example 14, the comparative cement dispersant (3) was used in Comparative Example 3, the comparative cement dispersant (4) was used in Comparative Example 4, and the comparative cement dispersant (5) was used in Comparative Example 5, and to perform experiments. Curing method of each Example is as shown in Table 5. Each result is shown in Table 5.

TABLE 5

| | | Addition amount | (MPa) Flow(mm) | Penetration resistance value Curing | | | | |
|---|---|---|---|---|---|---|---|---|
| | Dispersant | | | 3.5 h | 5 h | 6 h | 7 h | method |
| Example 4 | Cement dispersant (2) | 0.22 | 222 | — | 10.8 | — | 63.5 | A |
| Example 5 | Cement dispersant (2) | 0.22 | 222 | 67.3 | — | — | — | B |
| Example 6 | Cement dispersant (2) | 0.22 | 222 | — | 28.9 | — | — | C |
| Example 7 | Cement dispersant (3) | 0.23 | 210 | — | 13 | — | 70.5 | A |
| Example 8 | Cement dispersant (3) | 0.23 | 210 | >82.7 | — | — | — | B |
| Example 9 | Cement dispersant (3) | 0.23 | 210 | — | 44.7 | — | — | C |
| Example 10 | Cement dispersant (4) | 0.35 | 212 | — | 9.5 | 28.6 | 70.9 | A |
| Example 11 | Cement dispersant (4) | 0.35 | 212 | 66.7 | — | — | — | B |
| Example 12 | Cement dispersant (4) | 0.35 | 212 | — | 35 | — | — | C |
| Example 13 | Cement dispersant (5) | 0.35 | 218 | — | 8.0 | — | 55.9 | A |
| Example 14 | Cement dispersant (6) | 0.32 | 211 | — | 9.8 | — | 43.5 | A |
| Comparative Ex. 3 | Comparative cement dispersant (3) | 0.22 | 230 | — | 10.2 | — | 58.7 | A |
| Comparative Ex. 4 | Comparative cement dispersant (4) | 0.35 | 218 | — | 9.1 | 26.2 | 64.6 | A |
| Comparative Ex. 5 | Comparative cement dispersant (5) | 0.25 | 230 | — | 2.3 | — | 11.1 | A |

In the above-mentioned table, "Flow (mm)" is a flow value immediately after mixing mortar, namely, after 0 minute. Also, in the table, A, B and C denote the above-mentioned curing methods.

It is understood from Table 5 that the cement dispersant (2) composed of the copolymer of the present invention has a penetration resistance value exponent of 63.5 MPa, the cement dispersant (3) has a penetration resistance value exponent of 70.5 MPa, the cement dispersant (4) has a penetration resistance value exponent of 70.9 MPa, the cement dispersant (5) has a penetration resistance value exponent of 55.9 MPa, and the cement dispersant (6) has a penetration resistance value exponent of 43.5 MPa.

Also, it is apparent from the results of Table 5 that a high penetration resistance value is denoted in a shorter time than the case without any devices (curing method A) by heating test specimen (curing method B) or thermally insulating the periphery (curing method C). That is to say, by means of curing under the conditions of a temperature of 30° C. or more or curing by covering the periphery of a formwork with a heat insulator while using the cement dispersant composed of the copolymer of the present invention, the time for obtaining deformable strength can be shortened and the turnover of a formwork is increased so as to improve productivity.

(Change with Time of Flow Value)

With regard to Example 10, a flow value (mm) was measured after 0 minute, 15 minutes, 30 minutes, 45 minutes and 60 minutes. The results are shown in Table 6.

TABLE 6

| | Flow(mm) |
|---|---|
| After 0 min | 212 |
| After 15 min | 247 |
| After 30 min | 230 |
| After 45 min | 197 |
| After 60 min | 169 |

Also, a slump retention exponent was calculated from an initial mortar flow value (a mortar flow value after 0 minute) and a mortar flow value after 30 minutes by using the following expression;

Slump retention exponent (%)=100×(mortar flow value after 30 minutes)/(initial mortar flow value).

The result was 108.5%.

Furthermore, since the cement dispersant (4) has a penetration resistance value exponent of 70.9 MPa and a slump retention exponent of 108.5%, it is understood that the cement dispersant (4) is the polycarboxylic acid cement dispersant of the present invention, that is, the polycarboxylic acid cement dispersant which provides a cement composition having a penetration resistance value exponent of 55 MPa or more and a slump retention exponent of 80% or more.

The present application claims priority under 35 U.S.C. § 119 to Japanese Patent Application No.2003-106890, filed Apr. 10, 2003, entitled "POLYCARBOXYLIC ACID CEMENT ADMIXTURE AND METHOD FOR PRODUCING CONCRETE PRODUCT USING THE SAME", and Japanese Patent Application No.2003-110740, filed Apr. 15, 2003, entitled "METHOD FOR PRODUCING CONCRETE PRODUCT USING". The content of this application is incorporated herein by reference in its entirety.

The invention claimed is:

1. A polycarboxylic acid cement dispersant which provides a cement composition having a penetrating resistance value exponent of 55 MPa or more and a slump retention exponent of 80% or more, wherein the polycarboxylic acid cement dispersant comprises a polycarboxylic acid polymer having a polyoxyalkylene ester constituent unit (I) represented by the following general formula (1):

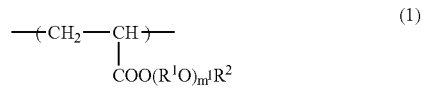

wherein $R^1O$ may be the sane or different and each represents an oxyalkylene group containing 2 to 18 carbon atoms; $m^1$ represents the average molar number of addition of to oxyalkylene groups and is a number of 100 to 200; and $R^2$ represents a hydrogen atom or a hydrocarbon group containing 1 to 3 atoms, and a carboxylic acid constituent unit (II) represented byte following general formula (2):

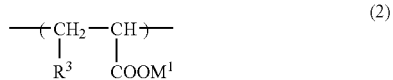
(2)

wherein $R^3$ represents a hydrogen atom, a methyl group or —$COOM^2$; and $M^1$ and $M^2$ may be to same or different and each represents a hydrogen atom, a monovalent metal, a divalent metal, ammonium or organic ammonium, wherein the polycarboxylic acid cement dispersant is obtained by copolymerizing the monomer components further comprising a sulfonic acid group-containing monomer represented by the following general formula (5):

(5)

X:

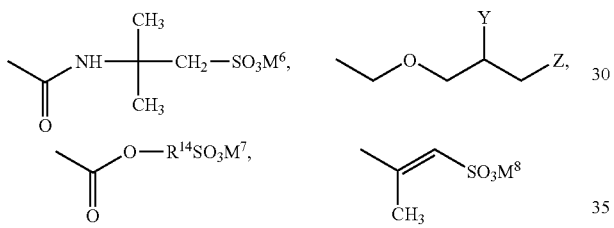

wherein $R^{12}$ and $R^{13}$ may be the same or different and each represents a hydrogen atom or a methyl group; Y and Z represent a hydroxyl group or —$SO_3M^9$, wherein in the case when Y represents a hydroxyl group, Z represents —$SO_3M^9$, while in the case when Y represents —$SO_3M^9$, Z represents a hydroxyl group; $R^{14}$ represents an alkylene group containing 2 to 4 carbon atoms; and $M^6$, $^7$, $M^8$ and $M^9$ may be the same or different and each represents a hydrogen atom, a monovalent metal, a divalent metal, ammonium or organic ammonium.

2. A method of producing a concrete product which comprises adding the polycarboxylic acid cement dispersant according to claim 1 to the concrete product and curing under a condition of a temperature of 30° C. or more.

3. A method of producing a concrete product which comprises adding the polycarboxylic acid cement dispersant according to claim 1 curing by covering a periphery of a formwork with an insulating material.

4. A method of producing a concrete product which makes use of a copolymer derived by using monomer components comprising a monomer (A) represented by the following general formula (3):

(3)

(wherein $R^4$, $R^5$ and $R^6$ may be the same or different and each represents a hydrogen atom or a methyl group; $p^1$ represents a number of 0 to 2; $q^1$ represents a number of 0 or 1; $R^7O$ may be the same or different and each represents an oxyalkylene group containing 2 to 18 carbon atoms; n represents the average molar number of addition of the oxyalkylene groups and is a number of 2 to 300; and $R^8$ represents a hydrogen atom or a hydrocarbon group containing 1 to 30 carbon atoms), monomer (B) represented by the following general formula (4)

(4)

(wherein $R^9$ and $R^{10}$ may be the same or different and each represents a hydrogen atom, a methyl group or —$COOM^4$, provided that $R^9$ and $R^{10}$ does not simultaneously represent —$COOM^4$; $R^{11}$ represents a hydrogen atom, a methyl group or $CH_2COOM^5$, $R^9$ and $R^{10}$ may be the same or different and each represents a hydrogen atom or a methyl group; and $M^3$, $M^4$ and $M^5$ maybe the same or different and each represents a hydrogen atom, a monovalent metal, a divalent metal, ammonium or organic ammonium), and a monomer (C) represented by the following general formula (5):

(5)

X:

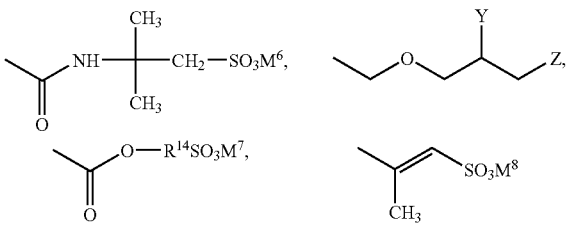

(wherein $R^{12}$ and $R^{13}$ may be the same or different and each represents a hydrogen atom or a methyl group; Y and Z represent a hydroxyl group or —$SO_3M^9$, in which in the case where Y represents a hydroxyl group, Z represents —$SO_3M^9$, while in the case where Y represents —$SO_3M^9$, Z represents a hydroxyl group; $R^{14}$ represents an alkylene group containing 2 to 4 carbon atoms; and $M^6$, $M^7$, $M^8$ and $M^9$ may be the same or different and each represents a hydrogen atom, a monovalent metal, a divalent metal, ammonium or organic ammonium), wherein the mass ratio of the monomer (C) relative to the total monomer components is not less than 0.1% by mass and not more than 35% by mass.

5. The method of producing a concrete product according to claim 4, which comprises a process of curing under a condition of a temperature of 30° C. or more.

6. The method of producing a concrete product according to claim 4, which comprises a process of curing by covering a periphery of a formwork with an insulating material.

7. The polycarboxylic acid cement dispersant according to claim 1 wherein X is 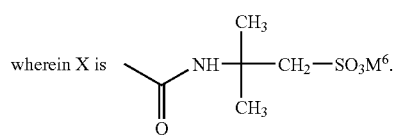

8. The polycarboxylic acid cement dispersant according to claim 1 wherein X is 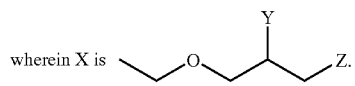

9. The polycarboxylic acid cement dispersant according to claim 1 wherein X is 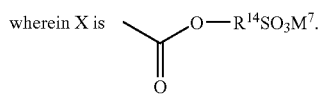

10. The polycarboxylic acid cement dispersant according to claim 1 wherein X is 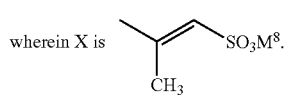

11. The method of producing a concrete product according to claim 2 wherein X is 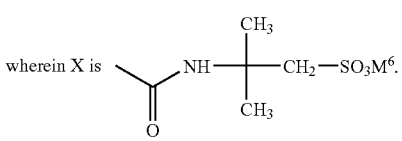

12. The method of producing a concrete product according to claim 2 wherein X is 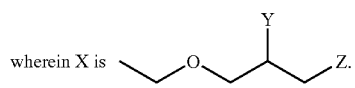

13. The method of producing a concrete product according to claim 2 wherein X is 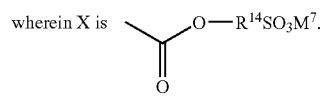

14. The method of producing a concrete product according to claim 2 wherein X is 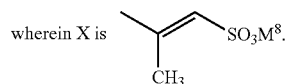

15. The method of producing a concrete product according to claim 3 wherein X is 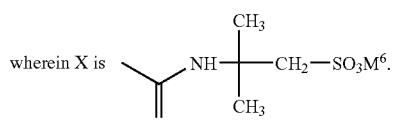

16. The method of producing a concrete product according to claim 3 wherein X is 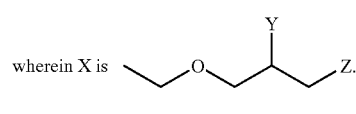

17. The method of producing a concrete product according to claim 2 wherein X is 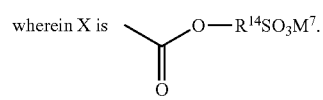

18. The method of producing a concrete product according to claim 2 wherein X is 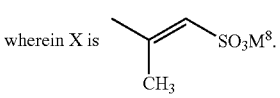

* * * * *